US012651601B2

(12) United States Patent
Chrysanthakopoulos

(10) Patent No.: US 12,651,601 B2
(45) Date of Patent: Jun. 9, 2026

(54) METHODS AND SYSTEMS FOR TRANSFORMING SPEECH INTO VISUAL TEXT

(71) Applicant: BIC Violex Single Member S.A., Anoixi (GR)

(72) Inventor: Nikolaos Chrysanthakopoulos, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 150 days.

(21) Appl. No.: 18/834,775

(22) PCT Filed: Feb. 6, 2023

(86) PCT No.: PCT/EP2023/052790
§ 371 (c)(1),
(2) Date: Jul. 31, 2024

(87) PCT Pub. No.: WO2023/160994
PCT Pub. Date: Aug. 31, 2023

(65) Prior Publication Data
US 2025/0166629 A1      May 22, 2025

(30) Foreign Application Priority Data

Feb. 25, 2022    (EP) ..................................... 22158763

(51) Int. Cl.
*G10L 15/26*          (2006.01)
*B43K 29/08*          (2006.01)
(Continued)

(52) U.S. Cl.
CPC .............. *G10L 15/26* (2013.01); *B43K 29/08* (2013.01); *B43K 29/10* (2013.01); *G06F 3/03545* (2013.01)

(58) Field of Classification Search
CPC ......... G10L 15/26; B43K 29/08; B43K 29/10; B43K 29/00; B43K 29/004; G06F 3/03545; G06F 3/038
See application file for complete search history.

(56) References Cited

U.S. PATENT DOCUMENTS 6,422,775 B1    7/2002  Bramlett et al.
11,084,318 B2   8/2021  Kurani et al.
(Continued)

FOREIGN PATENT DOCUMENTS

CN        204432095 U     7/2015
CN        105904882 A     8/2016
(Continued)

OTHER PUBLICATIONS

Kurihara et al. "Speech pen: predictive handwriting based on ambient multimodal recognition", CHI06: CHI 2006 Conference on Human Factors in Computing Systems (Year: 2006).*
(Continued)

*Primary Examiner* — Qian Yang
(74) *Attorney, Agent, or Firm* — Bookoff McAndrews, PLLC

(57)          ABSTRACT

A computer-implemented method for transforming speech into visual text, including obtaining a speech signal encoding a text of a speech; selecting a portion of the text at least based on a projection mode of a writing instrument; outputting the portion of the text towards a projector configured to project the portion of the text to a user of the writing instrument. The writing instrument may be used by the user to take notes of and during the speech and may include the projector, wherein the projector may be configured to project the portion of the text onto a writing surface being used by the user to write on with the writing instrument. The method may include projecting the portion of the text to the user.

20 Claims, 12 Drawing Sheets

Figure 1:
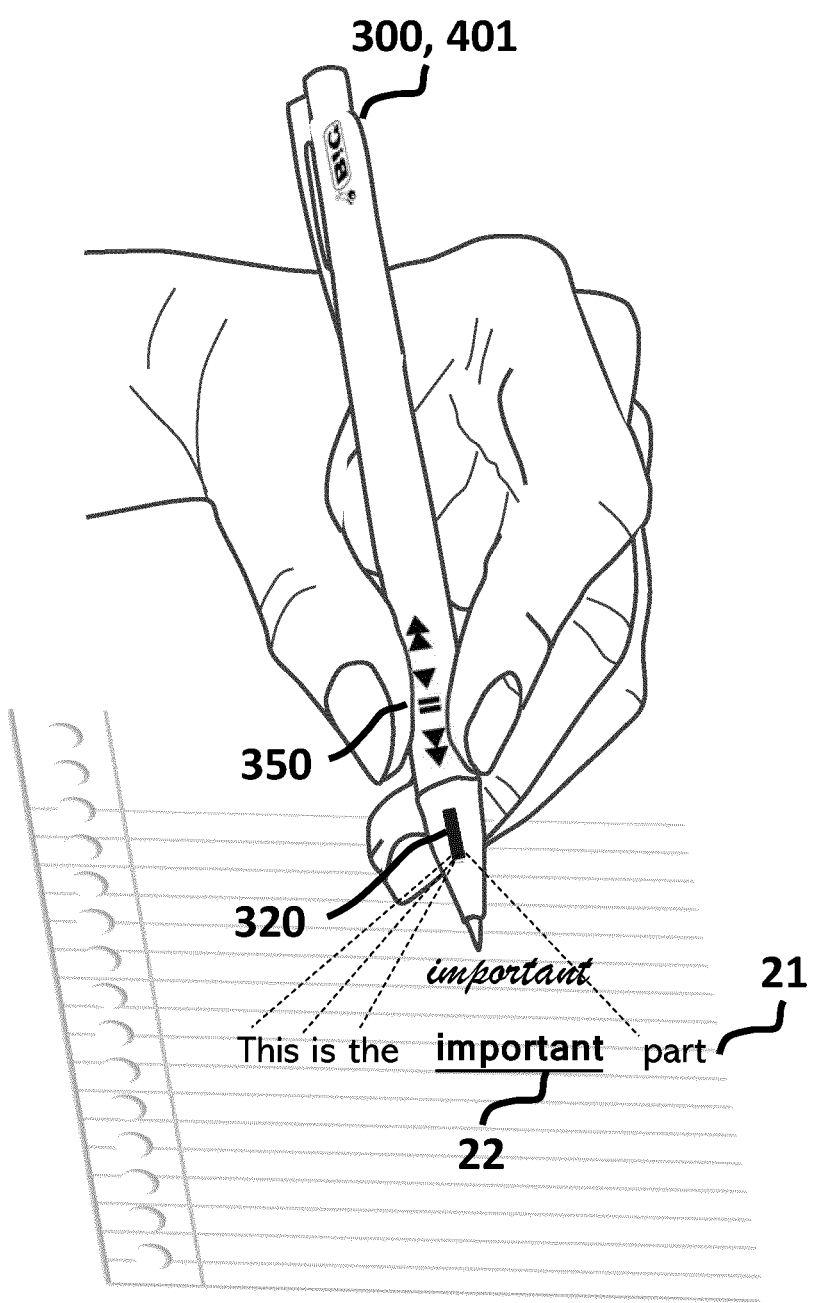

(51) Int. Cl.
B43K 29/10 (2006.01)
G06F 3/0354 (2013.01)

(56) References Cited

U.S. PATENT DOCUMENTS

| | | | |
|---|---|---|---|
| 2003/0233237 A1 | 12/2003 | Garside et al. | |
| 2005/0073657 A1* | 4/2005 | Wang | B43K 29/10 |
| | | | 348/E9.026 |
| 2005/0271458 A1 | 12/2005 | Kui | |
| 2006/0075347 A1 | 4/2006 | Rehm | |
| 2007/0005849 A1 | 1/2007 | Oliver | |
| 2008/0059196 A1 | 3/2008 | Huang | |
| 2009/0251337 A1 | 10/2009 | Marggraff et al. | |
| 2011/0044212 A1 | 2/2011 | Tani | |
| 2011/0288863 A1* | 11/2011 | Rasmussen | G10L 15/26 |
| | | | 704/235 |
| 2015/0081291 A1 | 3/2015 | Jeon | |
| 2015/0271651 A1* | 9/2015 | Alameh | H04W 4/12 |
| | | | 455/466 |
| 2020/0108653 A1 | 4/2020 | Kurani et al. | |

FOREIGN PATENT DOCUMENTS

| | | | |
|---|---|---|---|
| CN | 205523218 U | 8/2016 | |
| CN | 106142910 A | 11/2016 | |
| CN | 107662431 A | 2/2018 | |
| CN | 107662432 A | 2/2018 | |
| CN | 109318628 A | 2/2019 | |
| CN | 211641583 U | 10/2020 | |
| CN | 212379988 U | 1/2021 | |
| CN | 212472896 U | 2/2021 | |
| CN | 112562687 A | 3/2021 | |
| EP | 0886234 A1 | 12/1998 | |
| GB | 2440921 A | 2/2008 | |
| JP | 2004288188 A | 10/2004 | |
| JP | 2005275519 A | 10/2005 | |
| JP | 2012234552 A | 11/2012 | |
| WO | 2005091837 A3 | 10/2005 | |
| WO | 2014018184 A1 | 1/2014 | |

OTHER PUBLICATIONS

© 2007-2024 Flipkart.com. (n.d.). Flipkart.com | Zeeteck projector pen—projector pen. Flipkart Explore Plus. https://www.flipkart.com/zeeteck-projector-pen/p/itmeqpchmwhgygdc.

Copyright © 1996-2024 IndiaMART InterMESH Ltd. (n.d.). LED Projector Pen With Laser Light. indiamart.com. https://www.indiamart.com/proddetail/led-projector-pen-with-laser-light-7075346762.html.

Malarvezhi, P. (Oct. 28, 2017). Design of Self-writing Smart Pen Using Ocr Technology and Miniaturized Projection. https://gyti.techpedia.in/project-detail/design-of-self-writing-smart-pen-using-ocr-technology-and/11521.

Plastic Hardware Factory, M. (n.d.). Smart Led Projection Pen in 329 State Road. Tradeindia. https://www.tradeindia.com/products/smart-led-projection-pen-159799.html.

Search Report and Written Opinion issued in International Application No. PCT/EP2023/052790, mailed Aug. 31, 2023.

Song, H., Grossman, T., Fitzmaurice, G., Guimbretiere, F., Khan, A., Attar, R., & Kurtenbach, G. (Apr. 6, 2009). PenLight: Combining a Mobile Projector and a Digital Pen for Dynamic Visual Overlay. New Tabletop Input and Output 6 Methods. https://www.researchgate.net/publication/221515215_PenLight_Combining_a_mobile_projector_and_a_digital_pen_for_dynamic_visual_overlay.

* cited by examiner

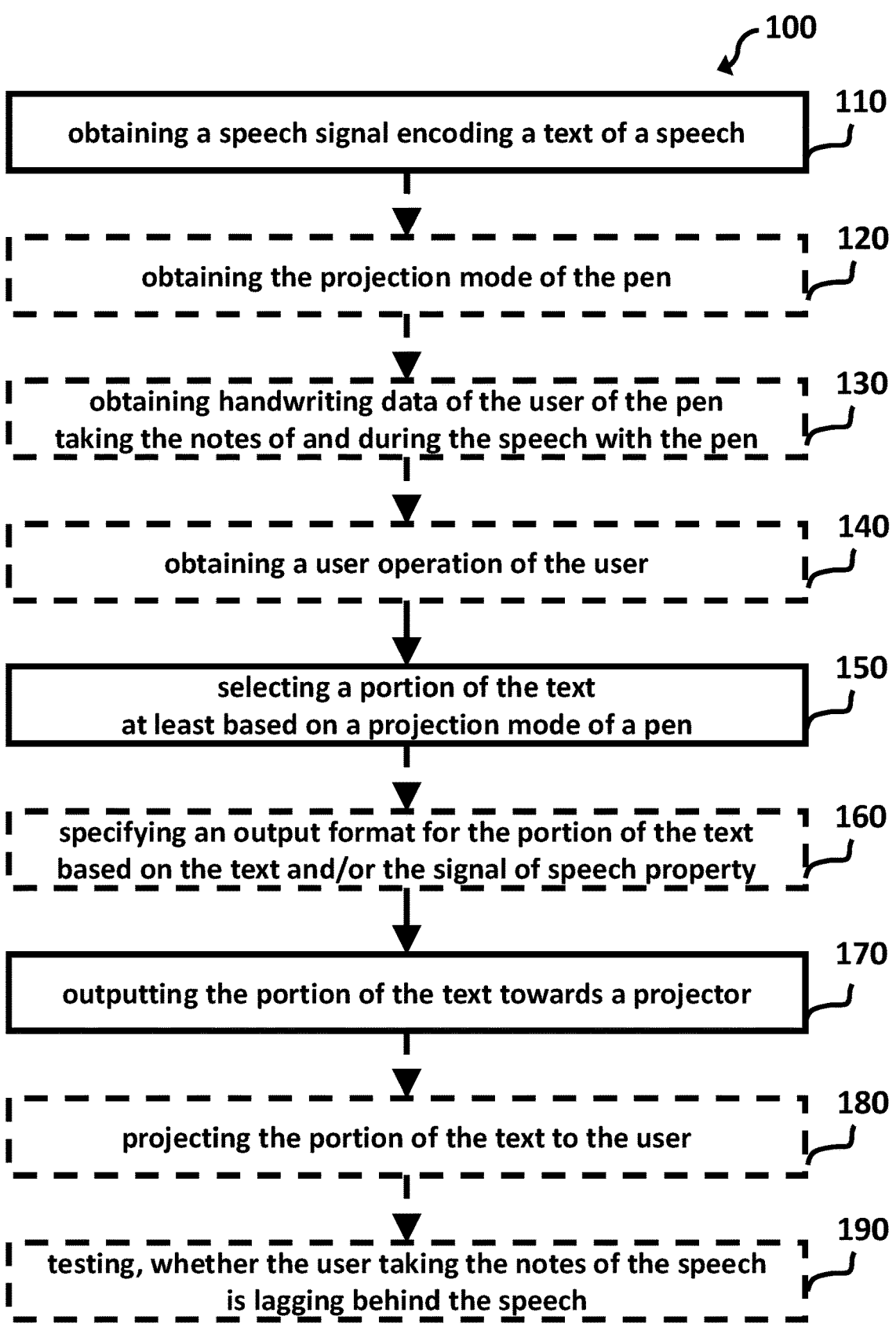

100

110   obtaining a speech signal encoding a text of a speech 120   obtaining the projection mode of the pen 130   obtaining handwriting data of the user of the pen taking the notes of and during the speech with the pen 140   obtaining a user operation of the user 150   selecting a portion of the text at least based on a projection mode of a pen 160   specifying an output format for the portion of the text based on the text and/or the signal of speech property 170   outputting the portion of the text towards a projector 180   projecting the portion of the text to the user 190   testing, whether the user taking the notes of the speech is lagging behind the speech

Fig. 2

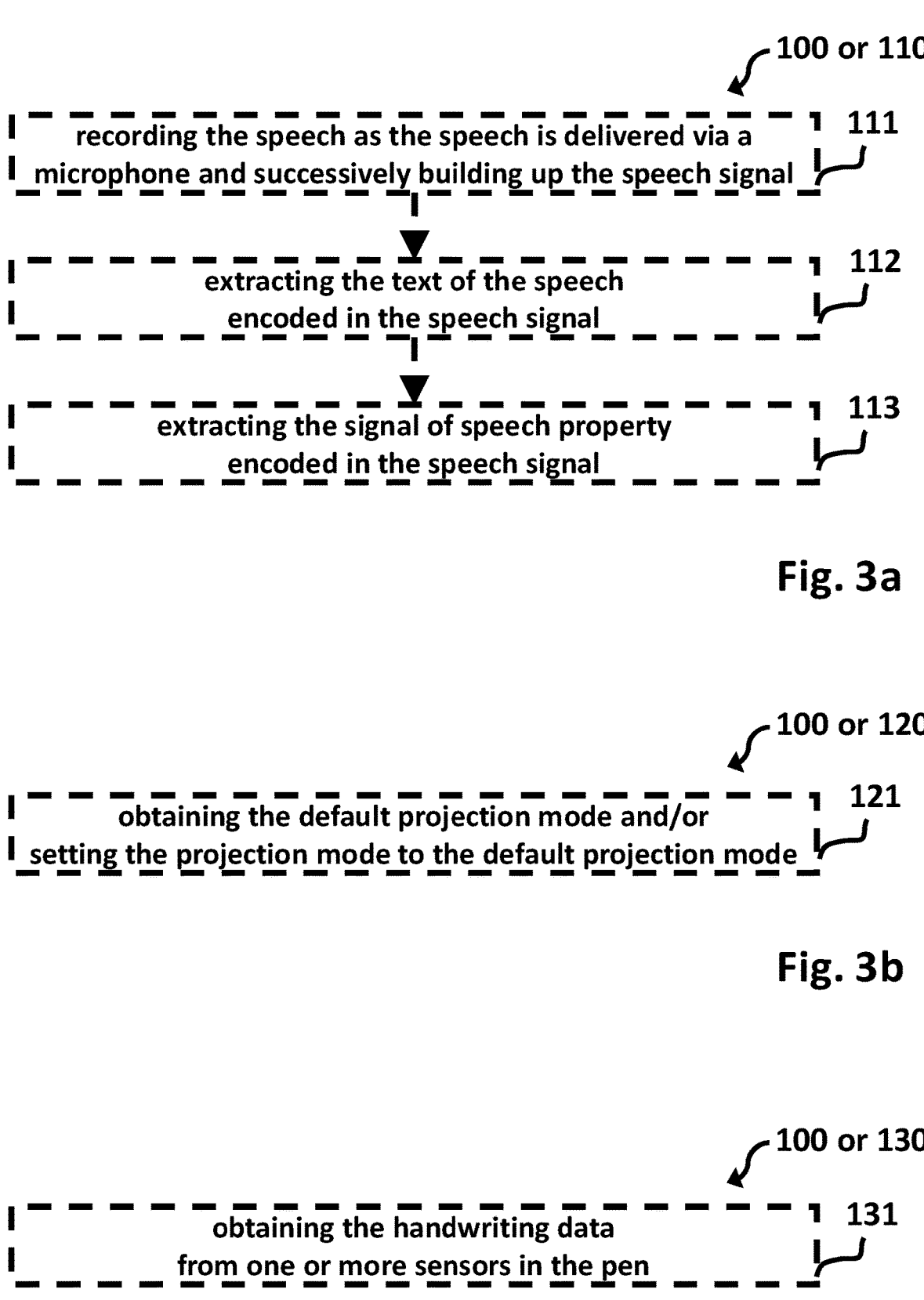

100 or 110 recording the speech as the speech is delivered via a microphone and successively building up the speech signal   111 extracting the text of the speech encoded in the speech signal   112 extracting the signal of speech property encoded in the speech signal   113

Fig. 3a

100 or 120 obtaining the default projection mode and/or setting the projection mode to the default projection mode   121

Fig. 3b

100 or 130 obtaining the handwriting data from one or more sensors in the pen   131

Fig. 3c

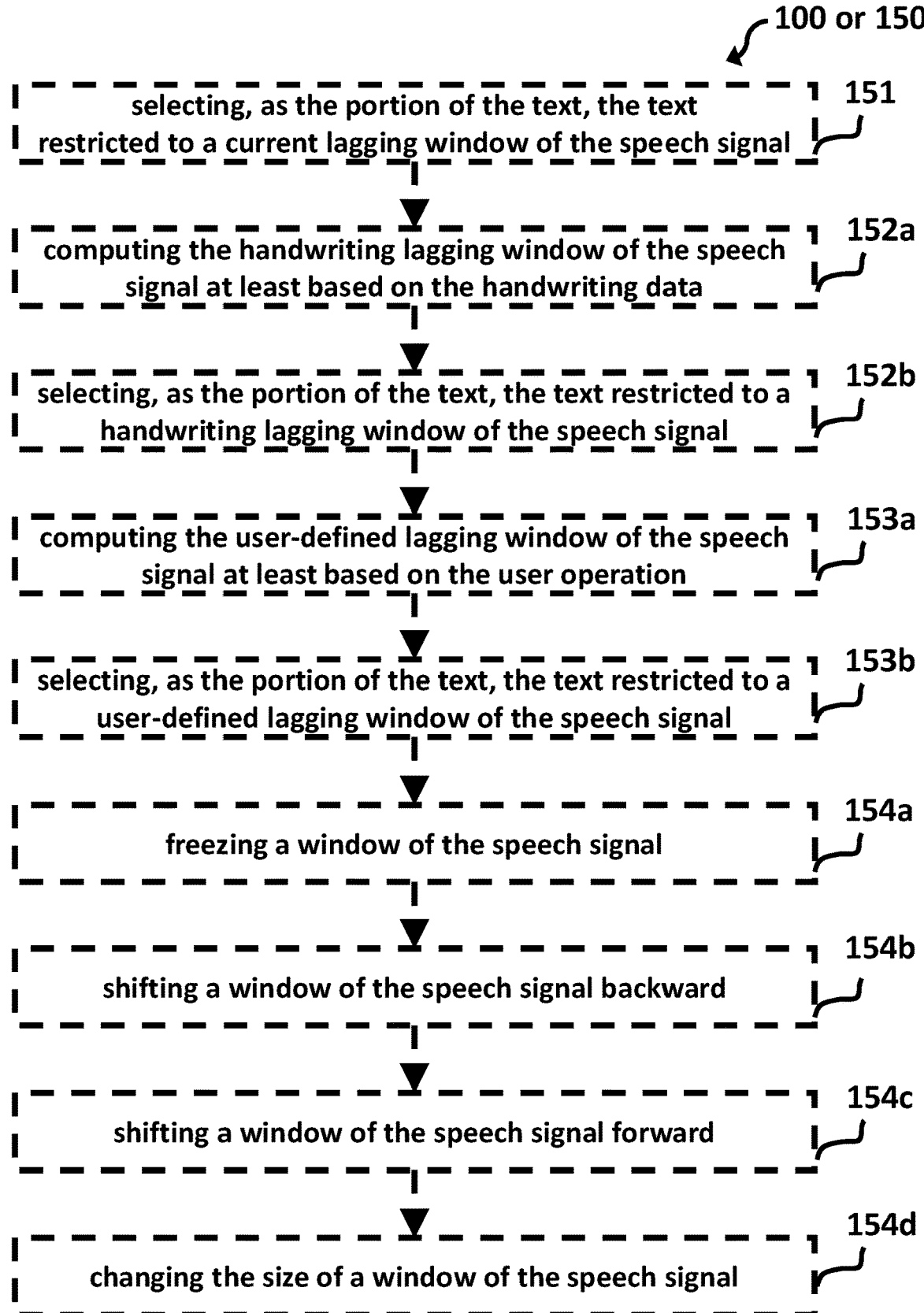

100 or 150

151
selecting, as the portion of the text, the text restricted to a current lagging window of the speech signal 152a
computing the handwriting lagging window of the speech signal at least based on the handwriting data 152b
selecting, as the portion of the text, the text restricted to a handwriting lagging window of the speech signal 153a
computing the user-defined lagging window of the speech signal at least based on the user operation 153b
selecting, as the portion of the text, the text restricted to a user-defined lagging window of the speech signal 154a
freezing a window of the speech signal 154b
shifting a window of the speech signal backward 154c
shifting a window of the speech signal forward 154d
changing the size of a window of the speech signal

Fig. 3d

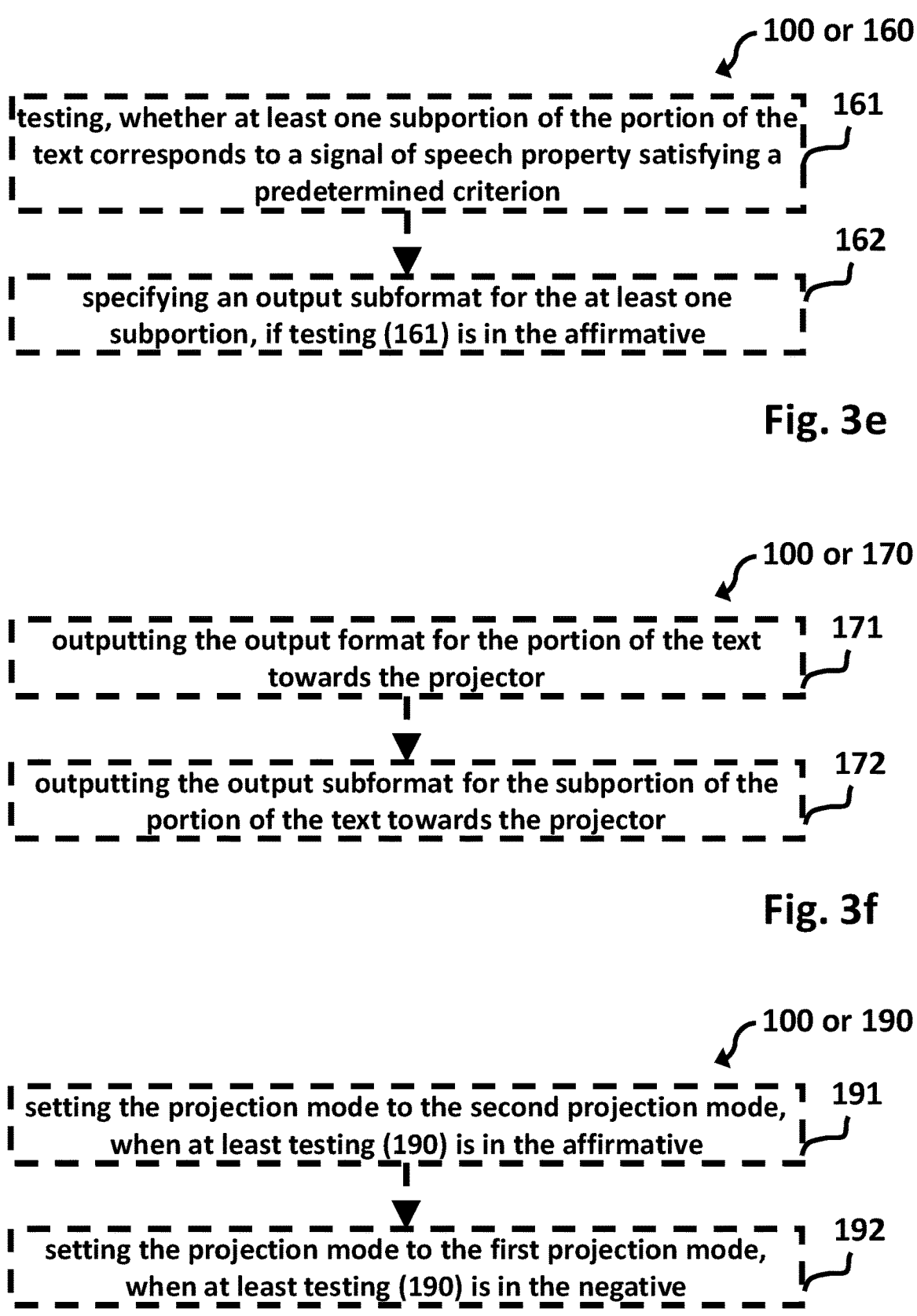

100 or 160

161
testing, whether at least one subportion of the portion of the text corresponds to a signal of speech property satisfying a predetermined criterion 162
specifying an output subformat for the at least one subportion, if testing (161) is in the affirmative

Fig. 3e

100 or 170

171
outputting the output format for the portion of the text towards the projector 172
outputting the output subformat for the subportion of the portion of the text towards the projector

Fig. 3f

100 or 190

191
setting the projection mode to the second projection mode, when at least testing (190) is in the affirmative 192
setting the projection mode to the first projection mode, when at least testing (190) is in the negative

Fig. 3g

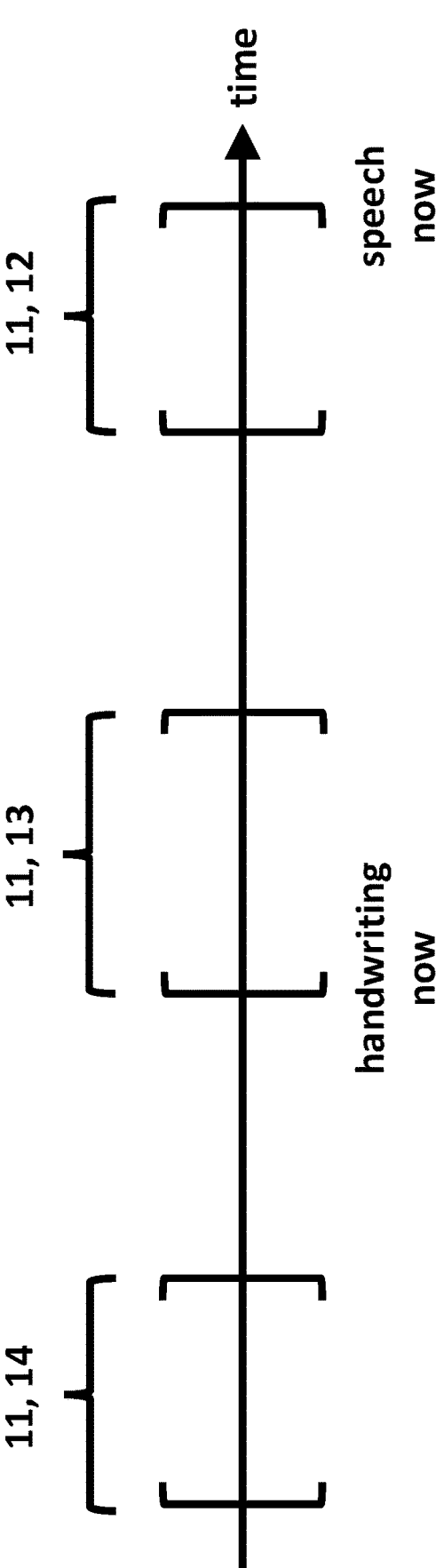
Fig. 4b

300, 401

Pen Hardware

Picoprojector

Microphone

Accelerometer/IMU

Microcontroller

Power source

Network capability

Operation buttons

Proximity sensor

Pen Software

Speech to text

Font properties transformation

Tone and emotion sensing from voice

Writing pace calculation

Operation firmware

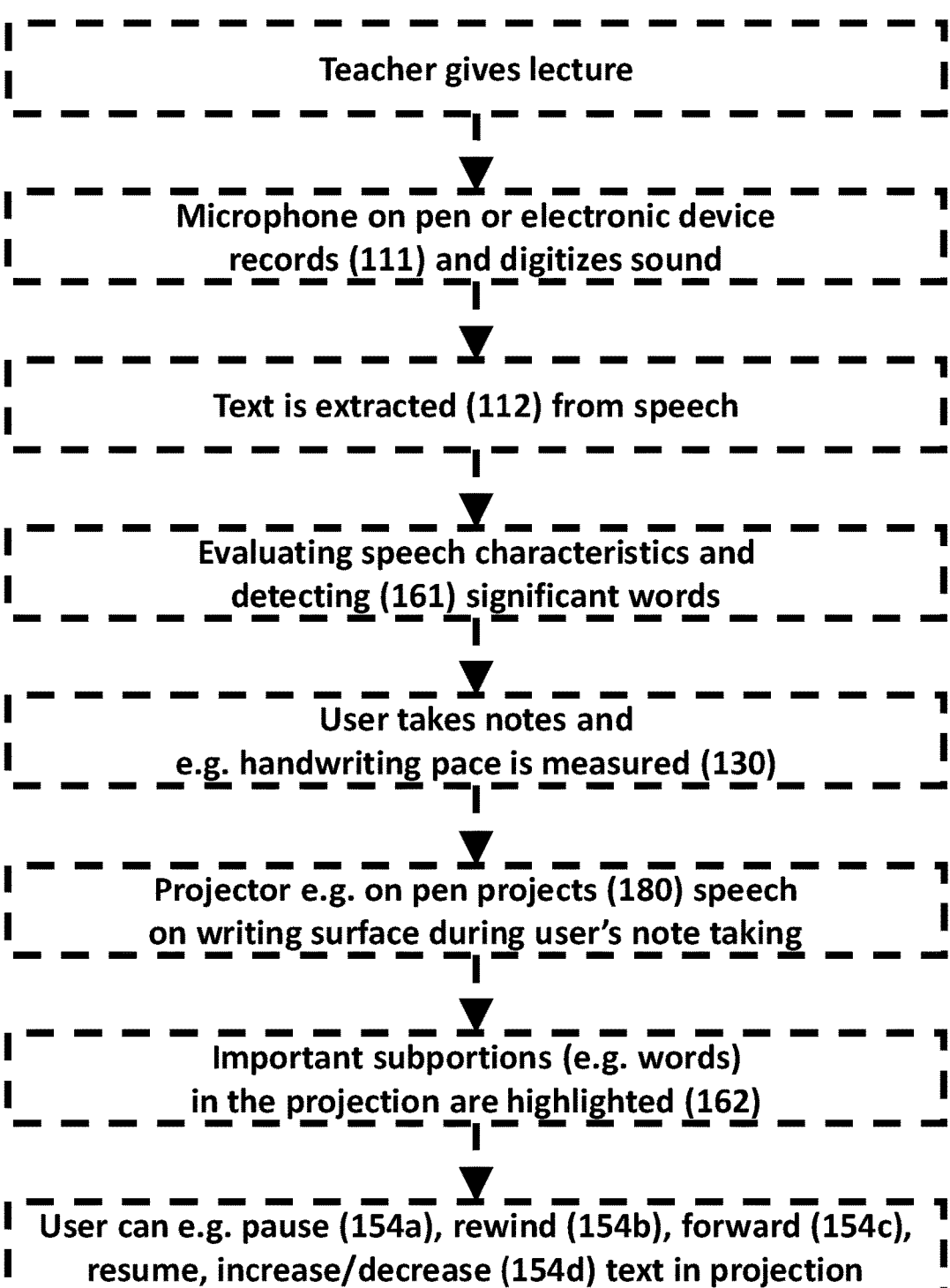

Teacher gives lecture

Microphone on pen or electronic device records (111) and digitizes sound

Text is extracted (112) from speech

Evaluating speech characteristics and detecting (161) significant words

User takes notes and e.g. handwriting pace is measured (130)

Projector e.g. on pen projects (180) speech on writing surface during user's note taking Important subportions (e.g. words) in the projection are highlighted (162)

User can e.g. pause (154a), rewind (154b), forward (154c), resume, increase/decrease (154d) text in projection

Fig. 8a

METHODS AND SYSTEMS FOR TRANSFORMING SPEECH INTO VISUAL TEXT

CROSS-REFERENCE TO RELATED APPLICATIONS

This is a National Stage Application under 35 U.S.C. § 371 of International Application No. PCT/EP2023/052790, filed Feb. 6, 2023, now published as WO 2023/160994 A1, which claims priority to European Patent Application No. 22158763.7, filed on Feb. 25, 2022, the entireties of which are incorporated herein by reference.

TECHNICAL FIELD

This specification relates to a computer-implemented method, a computer system, a writing instrument, and/or a writing instrument kit for transforming speech into visual text to be projected to a user of the writing instrument.

BACKGROUND

An image projector may be an optical device that projects an image onto a surface. Most projectors create an image by shining a light through a small transparent lens, but some newer types of projectors can project the image directly, by using lasers. Recently, handheld projectors have been developed that use lasers and/or LEDs to project images.

A handheld projector may be an image projector embedded in a handheld device. It was developed as a computer display device for compact portable devices, such as mobile phones, tablets and digital cameras, which have sufficient storage capacity to handle presentation materials but are too small to accommodate a display screen that an audience can see easily. Handheld projectors may involve miniaturized hardware and software that can project digital images onto a nearby viewing surface. For example, such a system may comprise a battery, electronics, one or more laser or LED light sources, a combiner optic and/or scanning micromirror devices.

The electronics system may turn the image into an electronic signal. The electronic signals may drive laser or LED light sources with different colors and intensities down different paths. In the combiner optic element, the different light paths may be combined into one path, defining a palette of colors. An important design characteristic of a handheld projector may be the ability to project a clear image on various viewing surfaces. Most micro projectors employ one of these imagers combined with color-sequential (RGB) LEDs in either a single or triple architecture format.

Different image technologies for micro projectors are known. For example, one image technology is Texas Instruments's Digital Light Processing (DLP). As another example, one image technology is MicroVision Inc.'s laser beam-steering (LBS). Furthermore, LCOS (Liquid crystal on silicon) manufacturers including Syndiant, Himax, Micron Technologies and Omnivision can usually supply companies with both LED and laser solutions.

Pico-projectors with ultra-small dimensions have become widely available for applications in augmented reality (AR) and/or smart glasses applications. For example, ST Microelectronics has developed a STAR Laser Beam Scanning (LBS) display for smart glasses implementation.

As an example, ST's LBS technology uses a compact projector and produces a bright image with rich colors, consuming relatively little power, and can e.g. be integrated aesthetically into a pair of smart glasses. Tiny MEMS mirrors create images by deflecting the laser beams emitted from compact diodes. They project the images onto waveguides or other combiner optics. The combiner optics are typically embedded in smart-glasses lenses, onto which the images are projected. Furthermore, as another example, ColorChip, has introduced a highly innovative, ultra-compact, efficient RGB Pico-Projector based on a PLC SystemOnGlass (SOG) platform. This product requires low power consumption, provides a high-quality image and is ready for high volume, cost sensitive applications. The dimensions of the combiner are as low as 2.5×5 mm, eliminating the need for complex and expensive packaging and easily fits on the arm of smart glasses.

Optical image stabilization technology for standalone or smartphone cameras has advanced a lot and can provide optical systems that can stabilize the projection as the user moves the writing instrument during writing eliminating eventual blurring. Picture blurring may be caused by hand jitter, a biological phenomenon occurring e.g. at a frequency below 20 Hz. Optical image stabilization technology is an effective solution for minimizing the effects of involuntary shake or vibration. It senses the vibration on the hosting system and compensates for lenses movements to reduce hand-jitter effects.

Artificial intelligence (AI) chips that can be implemented directly in a wearable device are known. For example, Ensilica, a provider of custom ASIC design and supply services, has created a customizable single-chip medical sensor ASIC platform to speed the development of wearable medical/fitness vital-sign monitoring products. Furthermore, as another example, Huami has unveiled a new AI chip for wearable devices. It is based on RISC-V architecture and it is both faster and more energy efficient than its predecessor, reducing overall power consumption by as much as 50%.

Automatic speech recognition algorithms have become available for portable devices (link). Conventional speech recognition systems comprise a large number of discrete components such as an acoustic model, a language model, a pronunciation model, a text-normalizer, an inverse-text normalizer, a decoder based on a Weighted Finite State Transducer (WFST), and so on. To obtain sufficiently high speech recognition accuracy with conventional systems, a very large language model is usually needed, which prohibits their on-device implementation.

Recently, fully neural network end-to-end speech recognition algorithms have been proposed that require much smaller memory footprints compared to conventional algorithms, therefore their on-device implementation has become feasible.

Examples for interactive font transformation algorithms are known. As an example, an AI algorithm that adapts the appearance of a computer font based on the user's interaction with the digital text has been recently developed. Algorithm measures user's reading speed and interactively changes the font's shape seamlessly and continuously to allow the user to read the text more easily.

Examples for emotion recognition algorithms are known. Emotions of a speaker may be derived by voice recognition in real time through an AI software. More generally, algorithms for recognition of speech properties (such as e.g. emotion) are known. For example, Nemesysco's Layered Voice Analysis A.I. is able to extract 51 voice parameters, which can then be isolated and associated, broadly, with 16 emotions. The system uses an 11 kHz sampling rate, which results in 11,025 points of data generated every single second.

Furthermore, researchers from MIT's Computer Science and Artificial Intelligence Laboratory (CSAIL) and Institute of Medical Engineering and Science (IMES) developed an artificially intelligent, wearable system that can predict whether a conversation is happy, sad, or neutral, based on a person's speech patterns and vitals.

SUMMARY

According to a first aspect, there is provided a computer-implemented method for transforming speech into visual text. The method comprises obtaining a speech signal encoding a text of a speech. The method further comprises selecting a portion of the text at least based on a projection mode of a writing instrument. The method further comprises outputting the portion of the text towards a projector configured to project the portion of the text to a user of the writing instrument. The writing instrument may be used by the user to take notes of and during the speech. The writing instrument may comprise the projector and the projector may further be configured to project the portion of the text onto a writing surface being used by the user (e.g. to write on with the writing instrument). The method may further comprise projecting the portion of the text to the user.

According to a second aspect, there is provided a computer system configured to execute the computer-implemented method of the first aspect (or an embodiment thereof) for transforming speech into visual text.

According to a third aspect, there is provided a computer program configured to execute the computer-implemented method of the first aspect (or an embodiment thereof) for transforming speech into visual text.

According to a fourth aspect, there is provided a computer-readable medium or signal storing the computer program of the third aspect (or an embodiment thereof).

According to a fifth aspect, there is provided a writing instrument for transforming speech into visual text comprising one or more sensors configured to capture handwriting data of a user taking with the writing instrument notes of and during a speech corresponding to a speech signal encoding a text of the speech. The writing instrument may further comprise a projector configured to project a portion of a text to the user, wherein the projector may further be configured to project the portion of the text onto a writing surface being used by the user (e.g. to write on with the writing instrument). The writing instrument may further comprise a computer system (e.g. of the second aspect or an embodiment thereof) configured to execute the computer-implemented method of the first aspect (or an embodiment thereof) for transforming speech into visual text. The writing instrument may further comprise a microphone configured to record the speech as the speech is delivered. The writing instrument may further comprise a user interface configured to obtain a projection mode of the writing instrument and/or to obtain a user operation. The user interface may comprise one or more control elements configured to obtain a user operation from the user. A user operation may comprise a pause command. Alternatively, or in addition, a user operation may comprise a rewind command. Alternatively, or in addition, a user operation may comprise a forward command. Alternatively, or in addition, a user operation may comprise a resume command. Alternatively, or in addition, a user operation may comprise a change-window-size command.

According to a sixth aspect, there is provided a writing instrument kit for transforming speech into visual text, comprising a writing instrument of the fifth aspect (or an embodiment thereof) and an electronic device, wherein the electronic device comprises a communication interface configured to communicatively couple to the writing instrument. The electronic device may further comprise a projector configured to project a portion of a text to the user. The projector may be configured to project the portion of the text onto or close to a writing surface being used by the user (e.g. to write on with the writing instrument). The electronic device may further comprise a computer system (e.g. of the second aspect or an embodiment thereof) configured to execute the computer-implemented method of the first aspect (or an embodiment thereof) for transforming speech into visual text. The electronic device may further comprise a microphone configured to record the speech as the speech is delivered. The electronic device may further comprise a user interface configured to obtain a projection mode of the writing instrument and/or to obtain a user operation. The user interface may comprise one or more control elements configured to obtain a user operation from the user. A user operation may comprise a pause command. Alternatively, or in addition, a user operation may comprise a rewind command. Alternatively, or in addition, a user operation may comprise a forward command. Alternatively, or in addition, a user operation may comprise a resume command. Alternatively, or in addition, a user operation may comprise a change-window-size command.

Dependent embodiments of the aforementioned aspects are given in the dependent claims/embodiments and explained in the following description, to which the reader should now refer.

The methods and/or systems of the aforementioned aspects are directed to assisting the user (of the writing instrument) in taking the notes of the speech (e.g. spoken words by a speaker other than the user). Thanks to the projection mode the portion of the text to be projected to the user of the writing instrument may be selected dynamically (e.g. depending on states, conditions, flags etc.). The methods and/or systems are configured so as to provide—e.g. automatically and/or interactively—the portion of the text that in a given situation/state best assists the user in taking the notes of the speech. The method of the first aspect (or an embodiment thereof) may thus be seen as a state machine. The user may e.g. be a pupil or a student.

When taking notes of a speech such as e.g. a talk or lecture a user may write with her/his usual writing pace that ranges according to her/his age and experience. For young kids the writing pace may e.g. range from 3 to 7 words per minute (wpm), while for adults it may increase to a range of 5 to 20 wpm. A comfortable pace for a slide show presentation by a speaker may range from 100 to 125 wpm but hearing and vocalizing words may be considered comfortable for paces up to 160 wpm. Thus, during a class or a lecture, a user such as e.g. a pupil or student may be easily distracted and may not be able to keep up with the pace of the speaker when taking notes.

On the other hand, reading a text may typically be a much faster process than writing, with an average reading rate being around 200 wpm. Research shows that pupils/students seem to read faster and concentrate better, when reading printed than digital words. Furthermore, they seem to retain more information when reading a text in print, than reading on a screen or listening to a speaker.

The issues being solved by the methods and systems in this specification comprise the following problems: When listening to a lecturer and taking notes, a listener may miss part of the speech because of distraction and/or mind wandering. Speech speed is much higher than writing speed, making it difficult for a regular person and more importantly for a young pupil/student taking notes to catch up. While taking notes a person may miss some of the important points of the speech. When listening to a speech one cannot go back if needed to and repeat part of the speech to understand it better or to remind oneself of the text.

In fact, methods and systems as disclosed in this specification solve these problems, being directed to project—e.g. in (almost) real time—the spoken words of the speech to e.g. the writing surface as portions of text, thereby assisting the user in note taking using the writing instrument. Furthermore, the disclosed methods and systems may be configured to recognize and highlight the important parts of the speech to the user, thereby enabling the user to identify them better and/or more easily. Furthermore, the disclosed methods and systems may be configured to adjust the rate of the projected portions of text according to the handwriting pace and/or the speech pace permitting a user writing too slowly to catch up. Furthermore, the disclosed methods and systems are configured to permit the user to control the projected text scrolling, through mechanical and/or virtual buttons in order to e.g. pause or rewind the lecture and re-read a specific part of the lecture facilitating the understanding of the speech.

FIGURE DESCRIPTION

FIG. 1 illustrates an example (smart) writing instrument for transforming speech into visual text via a projector on the writing instrument.

FIG. 2 schematically illustrates a computer-implemented method for transforming speech into visual text.

FIG. 3*a-g* schematically further detail steps of the computer-implemented method for transforming speech into visual text.

Figure 4A:
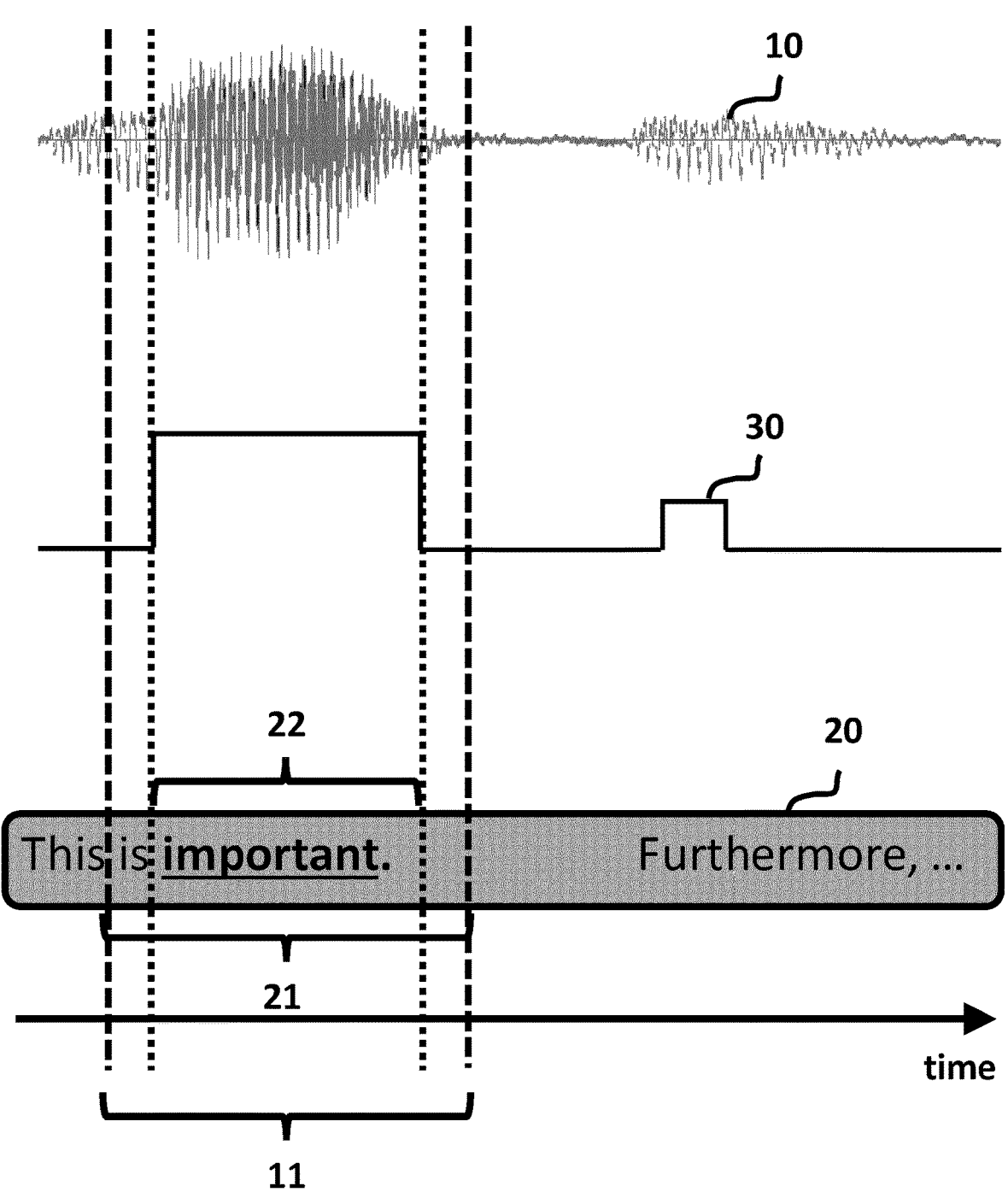

FIG. 4*a* illustrates an example for a speech signal, a text encoded in the speech signal, and a signal of speech property, as well as schematically illustrates the notion of a window, a portion of text, and a subportion of text.

FIG. 4*b* illustrates an example for a current lagging window, a handwriting lagging window, and a user-defined lagging window.

Figure 5:
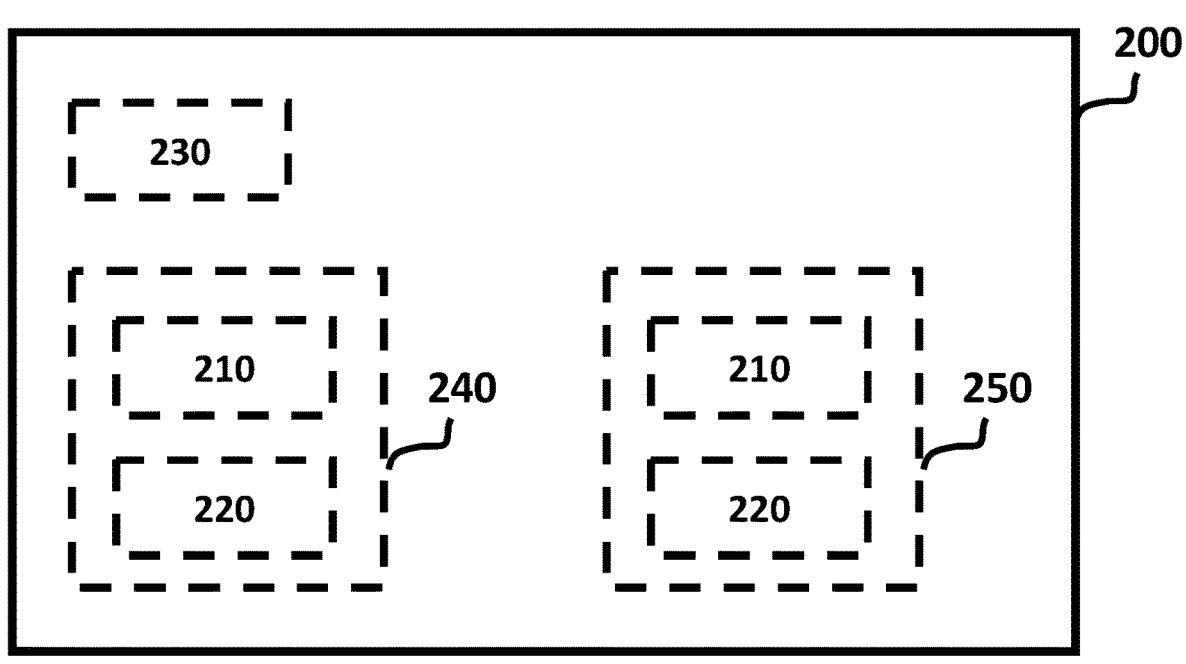

FIG. 5 schematically illustrates a computer system configured to execute the computer-implemented method for transforming speech into visual text.

Figure 6A:
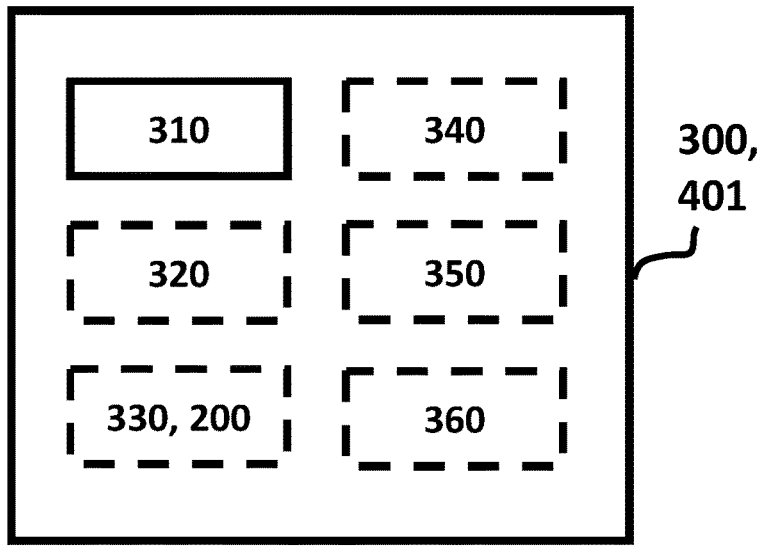

FIG. 6*a* schematically illustrates a writing instrument for transforming speech into visual text.

Figure 6B:
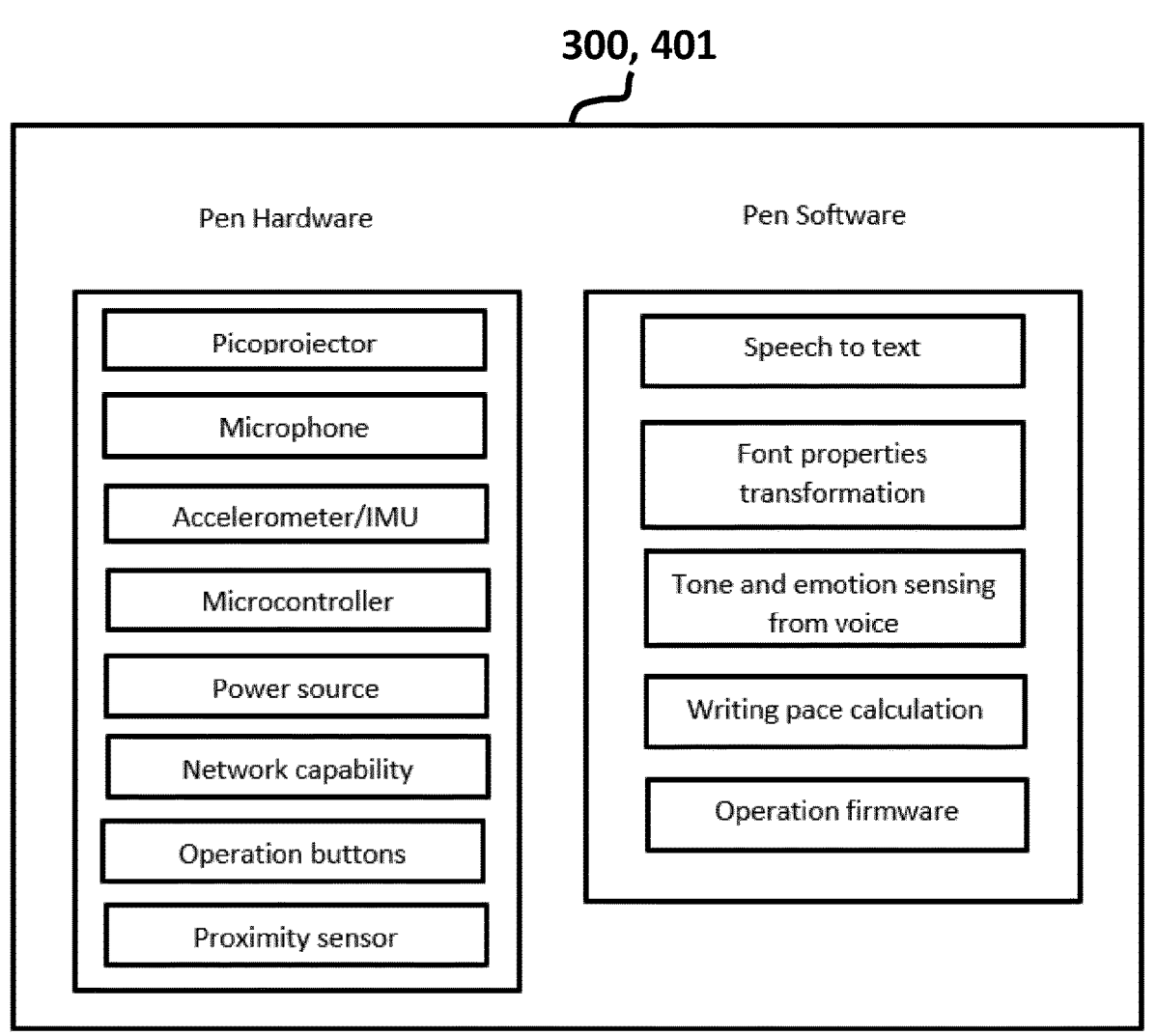

FIG. 6*b* illustrates an example embodiment of a writing instrument for transforming speech into visual text.

Figure 7:
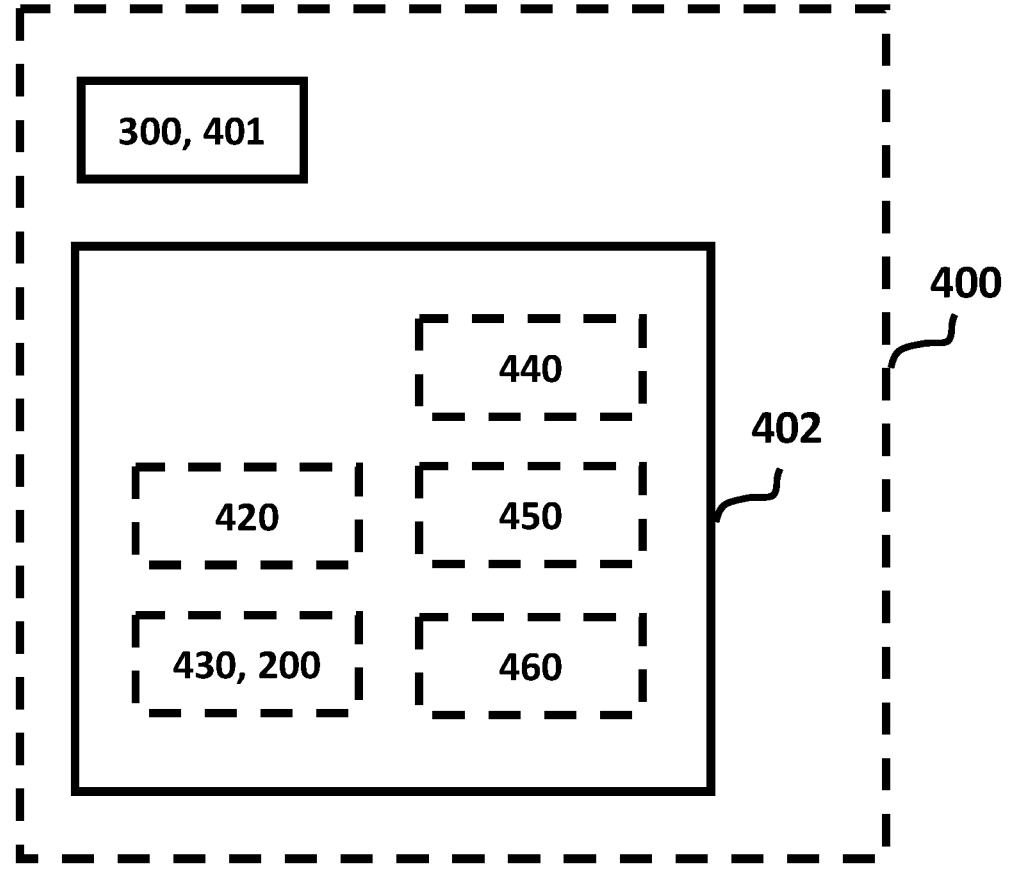

FIG. 7 schematically illustrates a writing instrument kit for transforming speech into visual text comprising a writing instrument and an electronic device.

Figure 8B:
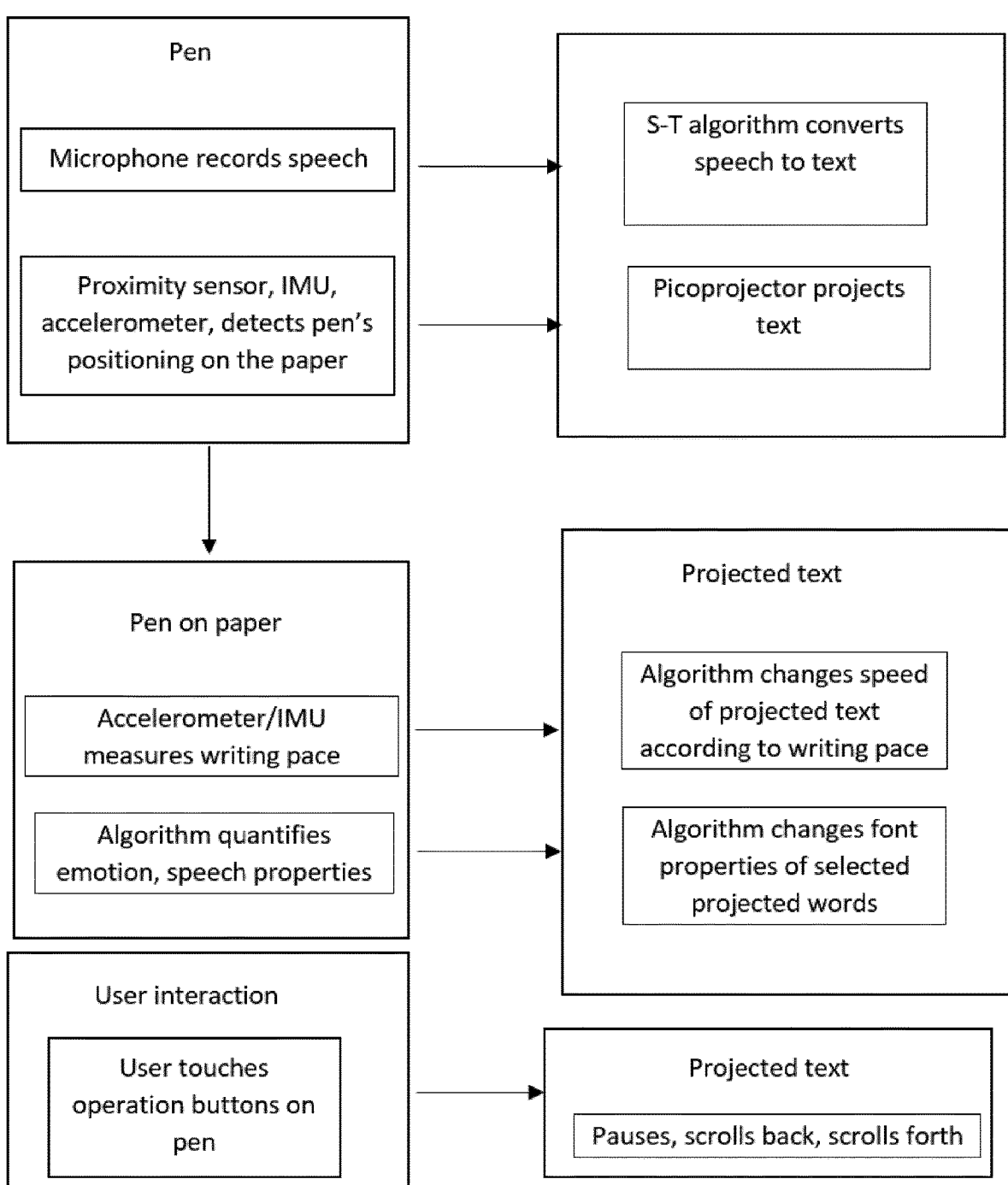

FIG. 8*a-b* illustrate example scenarios for transforming speech into visual text.

DETAILED DESCRIPTION

As an example, methods and systems as disclosed in this specification serve to assist a user in a note taking process during a speech. To this end, as an example and as illustrated in FIG. 1, a (smart) writing instrument 300, 401 with or without ink may comprise e.g. a pico-projector module 320 that is configured to adaptively project portions 21 of speech-to-text converted speech—e.g. word per word or sentence per sentence—in (almost) real time on the writing surface such as e.g. the notebook the user is writing on with the writing instrument 300, 401.

The properties of the portions 21 of text 20 projected may be dynamically adapted, according to e.g. a student's handwriting pace and/or teacher's speech tone and emotion, e.g. emphasizing specific words. As an example, when the system (e.g. the writing instrument 300, 401 and/or the electronic device 402 of the writing instrument kit 400) identifies that the user of the writing instrument 300, 401 writes too slowly the portions 21 of text 20 projected may slow down adaptively and/or extra text lines may be projected. In the latter case the scope of the projection may be enlarged.

As an example, when the system identifies emphasis, stronger tone and/or other vocal properties (commonly referred to as speech properties) in the speech signal resulting from the speaker such as e.g. a lecturer, the corresponding projected subportions 22 (e.g. single words) within the portions 21 of text 20 may be highlighted, animated, and/or transformed accordingly.

As an example, the user of the writing instrument 300, 401 may also interact with the projected portions 21 of text 20 as she/he is taking the notes, e.g. pausing, scrolling back and forth for several seconds through a sentence, and/or resuming the projection. Such interaction may be triggered and/or controlled by user input provided via a user interface 350, 450, with the use of e.g. respective buttons 350 on the writing instrument 300, 401, enabling the user to quickly read and then note down the highlighted important parts of the speech.

Hence, an example scenario comprises the following steps and features: The user may start taking notes of a speech with the writing instrument 300, 401 and activate e.g. via the user interface 350, 450 the speech projection. The (smart) writing instrument 300, 401 then starts to project portions of text from the converted speech on the writing surface such as e.g. the notebook the user is writing on. Upon obtaining 130 handwriting data from the user, the portions 21 of text 20 to be projected 180 may be selected 150 and/or altered. For example, the length, the number of lines and/or the scrolling speed of projected 180 portions 21 of text 20 may be varied according to the handwriting data, and in particular to the writing pace derived therefrom. Furthermore, specific subportions 22 (e.g. words) of the projected 180 portions 21 of text 20 may be highlighted according to e.g. the tone of the speaker. In FIG. 1 the subportion 22 "important" is e.g. highlighted in bold and underlining. Furthermore, in an interactive mode, the user is able to interact with the portions 21 to be projected. She/he may e.g. pause, move back and move forth the projected 180 portions 21 of text 20 by pushing respective controls on the smart writing instrument 300, 401.

In other words, an example system (e.g. the writing instrument 300, 401 and/or the writing instrument kit 400) may comprise an ink (smart) writing instrument 300, 401 with electronic components, a text projection module embedded in the writing instrument, an accelerometer/IMU 310 embedded in the writing instrument 300, 401, a processor 230, a memory 240, a power source embedded in the writing instrument 300, 401, a user interface 350 such as e.g. buttons on the (smart) writing instrument 300, 401 to control properties of projected portions 21 of text 20, and a software e.g. in the writing instrument 300, 401. For example, the software may comprise an artificial intelligence (AI) software configured to extract 112 text from a speech signal 10, an AI software configured to recognize emotions (or more generally, at least on speech property) in the speech, an AI software configured to adapt e.g. font properties such as size, density, and/or color of (sub) portions 21, 22 of the text 20 according to user and/or speaker characteristics, an AI software controlling the projected text rate, and an application with which the user may control settings and functions of the (smart) writing instrument 300, 401.

There is disclosed a computer-implemented method 100, as schematically illustrated in FIG. 2, a computer-implemented method 100 for transforming speech into visual text. The method 100 comprises obtaining 110 a speech signal 10 encoding a text 20 of a speech. The method 100 comprises selecting 150 a portion 21 of the text 20 at least based on a projection mode of a writing instrument 300, 401. The method 100 comprises outputting 170 the portion 21 of the text 20 towards a projector 320, 420 configured to project 180 the portion 21 of the text 20 to a user of the writing instrument 300, 401. The writing instrument 300, 401 (such as e.g. a pen) may be used by the user to take notes of and (essentially) during the speech.

The speech may be an act of speaking. Alternatively, or in addition, the speech may be a result of speaking. Alternatively, or in addition, the speech may comprise a voice message. The speech (or the speaking) may be delivered by one or more people other than the user of the writing instrument 300, 401. The speech may or may not be a speech in the sense of an oration. For example, the speech may be a talk or a lecture. Alternatively, or in addition, the speech may be a discussion among at least two people (other than the user of the writing instrument 300, 401). It may be immaterial whether or not the speech is delivered in person or via playback.

The term "towards a projector" may be replaced by "to a projector", e.g. if method 100 is implemented in the writing instrument 300, 401.

The writing instrument 300, 401 may or may not comprise the projector 320. As an example, the projector may be mounted in and/or on the writing instrument 300, 401, as e.g. in FIG. 1. The projector 320, 420 may be configured to project the portion 21 of the text 20 onto a writing surface being used by the user (e.g. to write on with the writing instrument 300, 401). As an example, the writing surface may comprise a surface of a sheet of paper or a notebook the user may be writing on using the writing instrument 300, 401. Furthermore, the writing surface may comprise a surface of a table or the like.

As schematically illustrated in FIG. 2, the method 100 may comprise projecting 180 the portion 21 of the text 20 to the user.

The projection mode may be one of a plurality of projection modes of the writing instrument 300, 401. In fact, the plurality of the projection modes of the writing instrument 300, 401 may comprise at least one projection mode. For example, the plurality of the projection modes of the writing instrument 300, 401 may comprise at least two projection modes. For example, the plurality of the projection modes of the writing instrument 300, 401 may comprise at least three projection modes. For example, the plurality of the projection modes of the writing instrument 300, 401 may comprise at least four projection modes and so forth. For example, the plurality of projection modes may comprise the first projection mode (described below). For example, the plurality of projection modes may comprise the second projection mode (described below). For example, the plurality of projection modes may comprise the third projection mode (described below). For example, the plurality of projection modes may comprise the first projection mode and the second projection mode. For example, the plurality of projection modes may comprise the first projection mode, the second projection mode and the third projection mode.

The projection mode (e.g. if the plurality of projection modes were to comprise only one projection mode in which case the term "plurality of projection modes" may be dispensable) or the plurality of projection modes may comprise a first projection mode. In case the plurality of projection modes comprises at least two projection modes, the plurality of projection modes may comprise the first projection mode. Selecting 150 the portion 21 of the text 20 at least based on the projection mode, in case the projection mode is the first projection mode, may comprise selecting 151, as the portion 21 of the text 20, the text 20 restricted to a current lagging window 11, 12 of the speech signal 10.

A window 11 may be a time interval (e.g. [−25 seconds, −20 seconds]). The window 11 may have an extension larger than zero (for example window [−25 seconds, −20 seconds] has extension 5 seconds). The (window 11 or the) time interval (e.g. [−25 seconds, −20 seconds]) may comprise points of time (e.g. −25 seconds, −24 seconds, . . . , −20 seconds) corresponding to coordinates of the speech signal 10.

A current lagging window 11, 12, as e.g. schematically illustrated in FIG. 4b, may be a window 11 of time having an extension larger than zero and extending to the present ("speech now") as far as the speech is concerned.

The current lagging window 11, 12 may be a window 11. The current lagging window 11, 12 may be a time interval (e.g. [−25 seconds, −20 seconds]). The current lagging window 11, 12 may have an extension larger than zero (for example window [−25 seconds, −20 seconds] has extension 5 seconds). The (current lagging window 11, 12 or the) time interval (e.g. [−25 seconds, −20 seconds]) may comprise points of time (e.g. −25 seconds, −24 seconds, . . . , −20 seconds) corresponding to coordinates of the speech signal 10 encoding a text 20 of a speech. The current lagging window 11, 12 may thus be seen as current lagging window 11, 12 of the speech signal.

The current lagging window 11, 12 may change as the speech progresses. The current lagging window 11, 12 may (always) extend to a time coordinate of the speech signal that corresponds (the time coordinate) to a currently (i.e. in the present) spoken speech element (e.g. a syllable, a vowel, a consonant, . . . ). It is in this sense that the current lagging window 11, 12 may be current. On the other hand, the current lagging window 11, 12 may (always) have an extension larger than zero lagging behind the time coordinate of the speech signal that corresponds (the time coordinate) to the currently spoken speech element. It is in this sense that the current lagging window 11, 12 may also be lagging.

In other words, a speech element 1 (e.g. a syllable, a vowel, a consonant, . . . ) of the speech ("speech now") may be spoken approximately at a given time coordinate t1. In this moment, the current lagging window (e.g. [t1−Δt1, t1]) may start at the time coordinate t1 minus a time lag Δt1 and extend to the time coordinate t1. In another (later) moment, another speech element 2 (again e.g. a syllable, a vowel, a consonant, . . . ) of the speech ("speech now") may be spoken approximately at a given time coordinate t2>t1. In that moment, the current lagging window may have been changed (e.g. to [t2−Δt2, t2]) as it may now start at the time coordinate t2 minus a time lag Δt2 and extend to the time coordinate t2. And so forth.

The projection mode (e.g. if the plurality of projection modes were to comprise only one projection mode in which case the term "plurality of projection modes" may be dispensable) or the plurality of projection modes may comprise a second projection mode. In case the plurality of projection modes comprises at least two projection modes, the plurality of projection modes may comprise the second projection mode. Selecting 150 the portion 21 of the text 20 at least based on the projection mode, in case the projection mode is the second projection mode, may comprise selecting 152*b*, as the portion 21 of the text 20, the text 20 restricted to a handwriting lagging window 11, 13 of the speech signal 10.

A handwriting lagging window 11, 13, as schematically illustrated in FIG. 4*b*, may be a window 11 of time having an extension larger than zero and which relates to the present ("handwriting now") as far as the handwriting of the user is concerned. Given that typically the handwriting lags behind the speech, the handwriting lagging window 11, 13 does typically not have to extend to the present ("speech now") as far as the speech is concerned.

The handwriting lagging window 11, 13 may be a window 11. The handwriting lagging window 11, 13 may be a time interval (e.g. [−25 seconds, −20 seconds]). The handwriting lagging window 11, 13 may have an extension larger than zero (for example window [−25 seconds, −20 seconds] has extension 5 seconds). The (handwriting lagging window 11, 13 or the) time interval (e.g. [−25 seconds, −20 seconds]) may comprise points of time (e.g. −25 seconds, −24 seconds, . . . , −20 seconds) corresponding to coordinates of the handwriting data and/or the speech signal 10 encoding a text 20 of a speech. Given that coordinates of the handwriting data may be mapped to coordinates of the speech signal 10 and vice versa, the handwriting lagging window 11, 13 may also be seen as handwriting lagging window 11, 13 of the speech signal.

The handwriting lagging window 11, 13 may change as the handwriting of the user progresses taking the notes of and during the speech with the writing instrument. The handwriting lagging window 11, 13 may (always) extend to—but also may go beyond—a time coordinate of the handwriting data that correspond (the time coordinate) to a currently (i.e. in the present) written handwriting element (e.g. a letter, a word, . . . ). It is in this sense that the handwriting lagging window 11, 13 refers to the (current) handwriting. On the other hand, the handwriting lagging window 11, 13 may (always) have an extension larger than zero lagging behind the time coordinate of the handwriting data that correspond (the time coordinate) to the currently written handwriting element. It is in this sense that the handwriting lagging window 11, 13 may also be lagging.

In other words, a handwriting element 1 (e.g. a letter, a word, . . . ) of the handwriting ("handwriting now") may be written by the user approximately at a given time coordinate t3. In this moment, the handwriting lagging window (e.g. [t3−Δt3, t3]) may start at the time coordinate t3 minus a time lag Δt3 and extend to the time coordinate t3. In another (later) moment, another handwriting element 2 (again e.g. a letter, a word, . . . ) of the handwriting ("handwriting now") may be written by the user approximately at a given time coordinate t4>t3. In that moment, the handwriting lagging window may have been changed (e.g. to [t4−Δt4, t4]) as it may now start at the time coordinate t4 minus a time lag Δt4 and extend to the time coordinate t4. And so forth.

As in FIG. 2, the method 100 may comprise obtaining 130 handwriting data of the user of the writing instrument 300, 401 taking the notes of and during the speech with the writing instrument 300, 401. As e.g. schematically illustrated in FIG. 3*c*, obtaining 130 the handwriting data may comprise obtaining 131 the handwriting data from one or more sensors 310 in the writing instrument 300, 401. As an example, obtaining 130 the handwriting data may also comprise obtaining contact data from one or more proximity/contact sensors 310 configured to sense contact of the writing instrument 300, 401 with the writing surface. Obtaining 130 the handwriting data may be restricted to obtaining handwriting data when the writing instrument 300, 401 is in contact with the writing surface.

As e.g. schematically illustrated in FIG. 3*d*, the method 100 may comprise computing 152*a* the handwriting lagging window 11, 13 of the speech signal 10 at least based on the handwriting data. Computing 152*a* the handwriting lagging window 11, 13 may e.g. be based on computing a handwriting rate/writing pace at least based on the handwriting data.

The projection mode (e.g. if the plurality of projection modes were to comprise only one projection mode in which case the term "plurality of projection modes" may be dispensable) or the plurality of projection modes may comprise a third projection mode. In case the plurality of projection modes comprises at least two projection modes, the plurality of projection modes may comprise the third projection mode. Selecting 150 the portion 21 of the text 20 at least based on the projection mode, in case the projection mode is the third projection mode, may comprise selecting 153*b*, as the portion 21 of the text 20, the text 20 restricted to a user-defined lagging window 11, 14 of the speech signal 10.

A user-defined window 11, 14, as schematically illustrated in FIG. 4*b*, may be a window 11 of time having an extension larger than zero anywhere between the start of the speech and the present ("speech now") as far as the speech is concerned. Unlike the display in FIG. 4*b*, a user-defined window 11, 14 may or may not overlap with a handwriting lagging window 11, 13 or with a current lagging window 11, 12.

The user-defined window 11, 14 may be a window 11. The user-defined window 11, 14 may be a time interval (e.g. [−25 seconds, −20 seconds]). The user-defined window 11, 14 may have an extension larger than zero (for example window [−25 seconds, −20 seconds] has extension 5 seconds). The (user-defined window 11, 14 or the) time interval (e.g. [−25 seconds, −20 seconds]) may comprise points of time (e.g. −25 seconds, −24 seconds, . . . , −20 seconds) corresponding to coordinates of the handwriting data and/or the speech signal 10 encoding a text 20 of a speech. Given that coordinates of the handwriting data may be mapped to coordinates of the speech signal 10 and vice versa, the user-defined window 11, 14 may also be seen as user-defined window 11, 14 of the speech signal.

The user-defined window 11, 14 may change as the speech progresses and/or as the handwriting of the user progresses taking the notes of and during the speech with the writing instrument. The user-defined window 11, 14 may also change based on the user operation of the user obtained 140.

As in FIG. 2, the method 100 may comprise obtaining 140 a user operation of the user. As in FIG. 3*d*, the method 100 may comprise computing 153*a* the user-defined lagging window 11, 14 of the speech signal 10 at least based on the user operation.

The user operation may be obtained 140 from the user via a user interface 350 of the writing instrument 300, 401. Alternatively, or in addition, the user operation may be obtained 140 from the user via a user interface 450 of an electronic device 402 communicatively coupled to the writing instrument 300, 401.

The user operation may be one of a plurality of user operations. For example, the plurality of the user operations may comprise at least one user operation. For example, the plurality of the user operations may comprise at least two user operations. For example, the plurality of the user operations may comprise at least three user operations. For example, the plurality of the user operations may comprise at least four user operations and so forth.

As e.g. in line with a pause button displayed in FIG. 1, the user operation (e.g. if the plurality of user operations were to comprise only one user operation in which case the term "plurality of user operations" may be dispensable) or the plurality of user operations may comprise a pause command. In case the plurality of user operations comprises at least two user operations, the plurality of user operations may comprise the pause command. Computing 153*a* the user-defined lagging window 11, 14 of the speech signal 10 at least based on the user operation, in case the user operation is the pause command, may comprise freezing 154*a* a window 11 of the speech signal 10. For example, the frozen 154*a* window 11 may be a (buffered) current lagging window 11, 12 of a (the) previous time step. Alternatively, and for example, the frozen 154*a* window 11 may be a (buffered) handwriting window 11, 13 of the previous time step. Alternatively, and for example, the frozen 154*a* window 11 may be a (buffered) user-defined lagging window 11, 14 of the previous time step. Freezing 154*a* the window 11 of the speech signal 10 may comprise keeping the window 11 of the speech signal 10. Keeping the window 11 may comprise neither moving nor changing the window 11 in a (the) next time step.

As e.g. in line with a rewind button displayed in FIG. 1, the user operation (e.g. if the plurality of user operations were to comprise only one user operation in which case the term "plurality of user operations" may be dispensable) or the plurality of user operations may comprise a rewind command. In case the plurality of user operations comprises at least two user operations, the plurality of user operations may comprise the rewind command. Computing 153*a* the user-defined lagging window 11, 14 of the speech signal 10 at least based on the user operation, in case the user operation is the rewind command, may comprise shifting 154*b* a window 11 of the speech signal 10 backward. For example, the window 11 may be a (buffered) current lagging window 11, 12 of the previous time step. Alternatively, and for example, the window 11 may be a (buffered) handwriting window 11, 13. Alternatively, and for example, the window 11 may be a (buffered) user-defined lagging window 11, 14 of the previous time step.

Furthermore, and for example, the rewind command may comprise a rewind speed. Shifting 154*b* the window 11 of the speech signal 10 backward may then be based on the rewind speed. As an example, the higher the rewind speed the higher the shift.

As e.g. in line with a forward button displayed in FIG. 1, the user operation (e.g. if the plurality of user operations were to comprise only one user operation in which case the term "plurality of user operations" may be dispensable) or the plurality of user operations may comprise a forward command. In case the plurality of user operations comprises at least two user operations, the plurality of user operations may comprise the forward command. Computing 153*a* the user-defined lagging window 11, 14 of the speech signal 10 at least based on the user operation, in case the user operation is the forward command, may comprise shifting 154*c* a window 11 of the speech signal 10 forward. For example, the window 11 may be a (buffered) current lagging window 11, 12 of the previous time step. Alternatively, and for example, the window 11 may be a (buffered) handwriting window 11, 13. Alternatively, and for example, the window 11 may be a (buffered) user-defined lagging window 11, 14 of the previous time step.

Furthermore, and for example, the forward command may comprise a forward speed. Shifting 154*c* the window 11 of the speech signal 10 forward may then be based on the forward speed. As an example, the higher the forward speed the higher the shift.

As e.g. in line with a resume(/play/activate) button displayed in FIG. 1, the user operation (e.g. if the plurality of user operations were to comprise only one user operation in which case the term "plurality of user operations" may be dispensable) or the plurality of user operations may comprise a resume command. In case the plurality of user operations comprises at least two user operations, the plurality of user operations may comprise the resume command. Computing 153*a* the user-defined lagging window 11, 14 of the speech signal 10 at least based on the user operation, in case the user operation is the resume command, comprises shifting 154*c* a window 11 of the speech signal 10 forward.

Furthermore, and for example, the resume command may comprise a resume speed. Shifting 154*c* the window 11 of the speech signal 10 forward may then be based on the resume speed. As an example, the higher the resume speed the higher the shift.

The resume command may also function as a play command and/or as an activate command (e.g. to start any projection). Alternatively, the plurality of user operations may comprise a (separate) play command and/or a (separate) activate command.

The user operation (e.g. if the plurality of user operations were to comprise only one user operation in which case the term "plurality of user operations" may be dispensable) or the plurality of user operations may comprise a change-window-size command. In case the plurality of user operations comprises at least two user operations, the plurality of user operations may comprise the change-window-size command. Computing 153*a* the user-defined lagging window 11, 14 of the speech signal 10 at least based on the user operation, in case the user operation is the change-window-size command, may comprise changing 154*d* the size of a window 11 of the speech signal 10. For example, the window 11 may be a (buffered) current lagging window 11, 12 of the previous time step. Alternatively, and for example, the window 11 may be a (buffered) handwriting window 11, 13. Alternatively, and for example, the window 11 may be a (buffered) user-defined lagging window 11, 14 of the previous time step.

As an example, the change-window-size command may comprise a (desired) size. Changing 154*d* the size of the window 11 of the speech signal 10 may then be based on the size (e.g. so as to reproduce the desired size). Changing the size may result in adding or removing extra lines for portions 21 of text 20 to be projected 180 depending on whether the size is increased or decreased, respectively. Changing the size may result in a larger or smaller projection area depending on whether the size is increased or decreased, respectively. It may be immaterial whether or not the (desired) size is absolute (e.g. 3 lines to be projected) or relative to a current size of the window (e.g. add one line to the lines to be projected).

As e.g. schematically illustrated in FIG. 3*b*, the method 100 of one of the preceding embodiments, may comprise obtaining 121 a default projection mode of the writing instrument 300, 401.

The default projection mode of the writing instrument 300, 401 may be any projection mode of the plurality of projection modes. As an example, the default projection mode (of the writing instrument 300, 401) may be the first projection mode. Alternatively, and as an example, the projection mode may be the second projection mode. In any case, obtaining 121 the default projection mode may comprise retrieving the default projection mode from a non-volatile memory 250 (e.g. of the computer system 200 schematically illustrated in FIG. 5).

As e.g. schematically illustrated in FIG. 2, the method 100 may comprise obtaining 120 the projection mode of the writing instrument 300, 401. For example, obtaining 120 the projection mode of the writing instrument 300, 401 may comprise obtaining 120 the projection mode of the writing instrument 300, 401 via a user interface 350 of the writing instrument 300, 401. Alternatively, and for example, obtaining 120 the projection mode of the writing instrument 300, 401 may comprise obtaining 120 the projection mode of the writing instrument 300, 401 via a user interface 450 of an/the electronic device 402 communicatively coupled to the writing instrument 300, 401.

Obtaining 120 the projection mode of the writing instrument 300, 401 may comprise 121 obtaining the default projection mode and/or setting the projection mode to the default projection mode.

As e.g. in FIG. 2, the method 100 may comprise testing 190, based on the handwriting data and the text 20, whether the user taking the notes of the speech is lagging behind the speech. Testing 190 may comprise applying the handwriting data and the text 20 to a machine learning algorithm pre-trained and configured for recognizing a lag between the user's note taking and the speech. Testing 190 may comprise quantifying the lag between the user's note taking and the speech. Thanks to lag recognition the user is enabled to catch up with taking notes of the speech.

As e.g. schematically illustrated in FIG. 3g, the method 100 may comprise setting 191 the projection mode to the second projection mode, when at least testing 190 is in the affirmative. Alternatively, or in addition, the method 100 may comprise setting 192 the projection mode to the first projection mode, when at least testing 190 is in the negative. Such settings may be subject to one or more conditions such as e.g. a certain value for a user-defined flag indicating whether lag recognition 190 is enabled or disabled. Setting the projection mode may have an effect upon repeating the method 100 in a next time step.

The handwriting lagging window 11, 13 of the speech signal 10 or computing 152a the handwriting lagging window 11, 13 of the speech signal 10 may be based on the quantified lag between the user's note taking and the speech.

For example, computing 152a the handwriting lagging window 11, 13 of the speech signal 10 may be such that the handwriting lagging window 11, 13 is increased to a current lagging window 11, 12 of the speech signal 10 and/or a window 11 change is decelerated, when at least testing 190 is in the affirmative. For example, such may be realized by projecting additional lines, until the user catches up. This may increase the projection resulting from projecting the portion 21 of the text 20 to the user.

For example, computing 152a the handwriting lagging window 11, 13 of the speech signal 10 may be such that the handwriting lagging window 11, 13 is decreased and/or a window 11 change is accelerated, when at least testing 190 is in the negative.

For example, the method 100 may comprise applying a writing pace calculation algorithm configured to take as an input, the handwriting rate of the user derived from the handwriting data and the text, for example as measured by one or more IMU sensors, and as an output, controls (e.g. via steps 150 and/or 152a) accordingly the projection rate of the text of the speaker in order to be synchronised with the handwriting pace. For example, this algorithm may operate in the conventional or the AI MCU chip of the (smart) writing instrument 300, 401. Whenever the writing pace is slow, the projected text rate will slow down or whenever the writing pace is high the projected text rate will accelerate. This is a function that may be performed automatically by the (smart) writing instrument 300, 401 or may be activated or cancelled by the user through the user interface 350 of the (smart) writing instrument 300, 401 or the control application 450 e.g. running on the electronic device 402. For example, the user may control the rate of the projected text through the buttons 350 located on the (smart) writing instrument 300, 401, at will. She/he could control the projected text's rate or pause, restart, forward, rewind the projected text, using the relevant control buttons located on the (smart) writing instrument or alternatively by the smartphone app 450.

The portion 21 of the text 20 may be selected 150 so as to assist the user in taking the notes of the speech.

Obtaining 110 the speech signal 10 encoding the text 20 of the speech may be done (essentially) while the user of the writing instrument 300, 401 is taking notes of the speech. Obtaining 110 the speech signal 10 may comprise successively obtaining the speech signal 10 as the speech is delivered. The speech signal 10 may be seen as a time series. As e.g. schematically illustrated in FIG. 3a, obtaining 110 the speech signal 10 may comprise 111 continuously recording the speech as the speech is delivered via a microphone 340, 440 of the writing instrument 300, 401 or of an electronic device 402 communicatively coupled to the writing instrument 300, 401 and successively building up the speech signal 10.

Furthermore, as e.g. schematically illustrated in FIG. 3a, the method 100 may comprise extracting 112 the text 20 of the speech encoded in the speech signal 10. Extracting 112 the text 20 of the speech encoded in the speech signal 10 may comprise applying the speech signal 10 to a machine learning algorithm pre-trained and configured to extract the text 20 of the speech (encoded in the speech). Extracting 112 the text 20 of the speech encoded in the speech signal 10 may comprise applying the speech signal 10 or parts thereof (the speech signal 10 being a successively increasing time series) to a/the machine learning algorithm pre-trained and configured to extract the text 20 or parts thereof. For example, the text 20 may be extracted 112 in the writing instrument 300, 401. Alternatively, the text 20 may be extracted 112 in an/the electronic device 402 communicatively coupled to the writing instrument 300, 401.

For example, the text 20 may be given in terms of a character encoding, such as e.g. ASCII, Unicode UTF-8, ISO 8859-1 etc. The text 20 may be a time series e.g. correlating words of the text 20 to absolute or relative times the words were spoken.

For example, the method may comprise applying a speech to text algorithm (e.g. step 112) configured to take the speech signal 10 as an input and to detect the text 20 of the speech from the speech signal 10 and then to digitize it and transform it to text, essentially in real time. For example, this algorithm may operate in the AI MCU chip of the (smart) writing instrument.

Alternatively, and for example, this algorithm may operate in the processor 230 of an adjacent electronic device 402.

This algorithm may be configured to feed, as an output, the pico-projector of the writing instrument with (portions 21 of) the converted text to be projected on the writing surface, essentially in real time, e.g. with a custom font having a specific color, a specific size, and/or a specific style, either default or user selected.

For example, (portions 21 of) extracted text may be projected 180 word per word. Alternatively, and for example, (portions 21 of) extracted text may be projected 180 in groups of words (e.g. 2 to 20 or preferably 2 to 10). Alternatively, and for example, (portions 21 of) extracted text may be projected 180 in as many words or sentences fit into a given number of lines of text to be projected. Alternatively, and for example, (portions 21 of) extracted text may be projected 180 sentence per sentence. Alternatively, and for example, (portions 21 of) extracted text may be projected 180 in a continuous way.

The speech signal 10 may further encode a signal of speech property 30 accompanying the speech (and hence, the text 20 of the speech) as the speech progresses. This is e.g. schematically illustrated in FIG. 4*a*.

As e.g. in FIG. 3*a*, the method 100 may comprise extracting 113 the signal of speech property 30 encoded in the speech signal 10. Extracting 113 the signal of speech property 30 encoded in the speech signal 10 may comprise applying the speech signal 10 to a machine learning algorithm pre-trained and configured to extract the signal of speech property 30 accompanying the speech. Extracting 113 the signal of the speech property encoded in the speech signal 10 may comprise applying the speech signal 10 or parts thereof (the speech signal 10 being a successively increasing time series) to a/the machine learning algorithm pre-trained and configured to extract the signal of speech property 30 or parts thereof (the signal of speech property 30 being a successively increasing time series).

For example, the signal of speech property 30 may be extracted 113 in the writing instrument 300, 401. Alternatively, and for example, the signal of speech property 30 may be extracted 113 in an/the electronic device 402 communicatively coupled to the writing instrument 300, 401.

The speech property may at least relate to emphasis of the speech signal 10. Alternatively, or in addition, the speech property may at least relate to phonation of the speech signal 10. Alternatively, or in addition, the speech property may at least relate to loudness of the speech signal 10. Alternatively, or in addition, the speech property may at least relate to intonation of the speech signal 10. Alternatively, or in addition, the speech property may at least relate to stress of the speech signal 10. Alternatively, or in addition, the speech property may at least relate to a rate of the speech signal 10. Alternatively, or in addition, the speech property may at least relate to a pitch level of the speech signal 10.

The signal of speech property 30 may be a multi-valued signal. As an example, the signal of speech property 30 may be a map from time (the signal being a time series) to a vector in a vector space. As an example, the vector space may be spanned by one or more of emphasis, phonation, loudness, intonation, stress, rate, pitch level (each of the speech signal 10).

As e.g. in FIG. 2, the method 100 may comprise specifying 160 an output format for the portion 21 of the text 20 based on the text 20 and/or the signal of speech property 30. As e.g. schematically illustrated in FIG. 3*f*, the method 100 may comprise outputting 171 the output format for the portion 21 of the text 20 towards (or to) the projector 320,

420. The projector 320, 420 may be further configured to project 180 the portion 21 of the text 20 in the specified 160 output format to the user.

As e.g. schematically illustrated in FIG. 3*e*, the method 100 may comprise testing 161, whether at least one subportion 22 of the portion 21 of the text 20 corresponds to a (part of the) signal of speech property 30 satisfying a predetermined criterion. The method 100 may then comprise specifying 162 an output subformat for the at least one subportion 22, if testing 161 is in the affirmative. As e.g. in FIG. 3*f*, the method 100 may then comprise outputting 172 the output subformat for the subportion 22 of the portion 21 of the text 20 towards (or to) the projector 320, 420. The projector 320, 420 may be further configured to project 180 the subportion 22 of the portion 21 of the text 20 in the specified 162 output subformat to the user.

Step 160 may or may not comprise steps 161, 162. Step 171 may or may not comprise step 162. Steps 160, 161, 162 may be combined to one step e.g. outputting the portion 21 of the text 20 in terms of a markup language such as e.g. HTML/CSS.

For example, the method 100 may comprise applying an emotion/speech-properties-sensing from-voice-algorithm (e.g. step 113). This may be an algorithm that, takes the speech signal 10 as an input, and detects and quantifies the emotion and speech properties of the speech of a speaker. For example, this algorithm may operate in the AI MCU chip of the (smart) writing instrument. Alternatively, and for example, this algorithm may operate in the processor of an adjacent electronic device 402. This algorithm may detect and quantify for example one or more of the following voice characteristics of the voice of the speaker during the pronunciation of specific words: emphasis, phonation, loudness, intonation, stress, rate, and/or pitch level. For example, this algorithm may produce, as an output, a number that corresponds to the sum or the average or the product of an equation of one, multiple or all of the voice characteristics listed above, during a word pronunciation. This number may e.g. be represented on a scale of 0 to 10.

For example, the method 100 may comprise applying a font properties changing algorithm (e.g. steps 160, 171 and/or steps 161, 162, 172). This may be an algorithm that, as an input, takes the number of the quantified emotion and speech properties, characterizing one or more words of the speech, compares it to a predetermined threshold (more generally testing it against the predetermined criterion) and changes accordingly the projected text font properties. For example, this algorithm may operate in the conventional or AI MCU chip of the (smart) writing instrument 300, 401. For example, when the quantified voice property is over an automatic or user selected predetermined threshold the algorithm may transform the projected text font of the relevant word or words with e.g. one or more of the following ways: a different font, a different color, a different size, a different spacing, a different font style (bold, italic, etc.), underlining the letters/words, highlighting the letters/words, flashing the letters, putting the letters in a different case, and/or adding a text effect such as glow, shadow, reflection or the like.

FIG. 8*a-b* illustrate example scenarios for the method 100. A speaker/presenter may give a lecture/speech and speaks e.g. in a quiet room. The user may activate note assistant capabilities of her/his (smart) writing instrument 300, 401. The microphone on the (smart) writing instrument or on an adjacent electronic device 402, may record and digitize the speech, thereby successively generating a speech signal 10. An algorithm in the (smart) writing instrument or in the adjacent electronic device may convert the speech signal to text, essentially in real time. The user may take the (smart) writing instrument and start taking handwritten notes on the writing surface such as e.g. a notebook. A proximity/contact sensor 310 may sense contact of the (smart) writing instrument with the writing surface. A pico-projector in the (smart) writing instrument may start projecting converted portions 21 of text 20 next to the handwritten notes. One or more IMU/accelerometer 310 may measure the handwriting data, and therefrom (and e.g. based on the text) the handwriting pace of the user. For example, in the second projection mode of the writing instrument, the rate of projected text (e.g. via a rate of change of window) may vary according to the handwriting pace. An algorithm in the (smart) writing instrument or the adjacent electronic device may quantify emotion and, more generally, one or more properties of speech. For example, if the quantified speech properties level exceeds the predetermined threshold for one or more words of the speech, then the algorithm on the (smart) writing instrument or the adjacent electronic device may change e.g. the font properties-more generally, the output format or output subformat—of the corresponding words, e.g. emphasizing their meaning to the user. According to her/his needs, the user may control projected text flow with the use of control buttons 350 on the writing instrument, or a relative smartphone app 450. For example, the user may pause, forward, and/or rewind a sentence of the projected portions 21 of text 20 in order to read it again to understand its meaning and note it down better or correctly.

Furthermore, and as schematically illustrated in FIG. 5, there is disclosed a computer system 200 configured to execute the computer-implemented method 100 for transforming speech into visual text. The computer system 200 may comprise at least one processor 230. Furthermore, the computer system 200 may comprise a memory 240 such as e.g. a RAM. The computer system 200 may comprise a non-volatile memory 250. The memory 240 and/or the non-volatile memory 250 may be used to buffer the speech signal 10, the text 20, the signal of speech property 30, the (current) window 11, the portion 21 of text 20, the subportion 22, the output format and/or the output subformat. As e.g. schematically illustrated in FIG. 6*a* or FIG. 7, the computer system 200, 330, 430 may be in the writing instrument 300, 401 and/or in the electronic device 402 communicatively coupled to the writing instrument 300, 401.

Furthermore, there is disclosed a computer program 210 configured to execute the computer-implemented method 100 for transforming speech into visual text. The computer program 210 may be e.g. in interpretable or in compiled form. It may be loaded (also in parts) for execution e.g. as a bit or byte sequence into the memory/RAM 240 of a computer 200.

Furthermore, there is disclosed a computer-readable medium or signal 220 storing the computer program 210. The medium may include, for example, one of RAM, ROM, EPROM, HDD, SDD, etc. on/in which the signal is stored.

Furthermore, and as e.g. schematically illustrated in FIG. 6*a-b*, there is disclosed a writing instrument 300, 401 for transforming speech into visual text, comprising one or more sensors 310 configured to capture handwriting data of a user taking with the writing instrument 300 notes of and during a speech corresponding to a speech signal 10 encoding a text 20 of the speech. The writing instrument 300 may be a smart writing instrument. The writing instrument 300 may be a pen or a smart pen. Alternatively, or in addition, the writing instrument may be a pencil or a smart pencil. The writing instrument 300 may be a brush or a smart brush and so forth.

As e.g. in FIG. 1, the writing instrument 300 may comprise a projector 320 configured to project 180 a portion 21 of a text 20 to the user. The projector 320 may be configured to project 180 the portion 21 of the text 20 onto a writing surface being used by the user (e.g. to write on with the writing instrument 300). The projector 320 may be a pico-projector.

The writing instrument 300 may comprise a computer system 200, 330, e.g. a computer system 200, 330 configured to execute the computer-implemented method 100 (or parts thereof) for transforming speech into visual text. In this case, the computer-implemented method 100 for transforming speech into visual text (or parts of the method 100) may be executed in the writing instrument 300, 401.

The writing instrument 300 may comprise a microphone 340 configured to record the speech as the speech is delivered.

As e.g. in FIG. 1, the writing instrument 300 may comprise a user interface 350 configured to obtain 120 a projection mode of the writing instrument 300 and/or to obtain 140 a user operation. The user interface 350 may comprise one or more control elements configured to obtain a user operation from the user. For example, a user operation may comprise a pause command. Alternatively, or in addition and for example, a user operation may comprise a rewind command. Alternatively, or in addition and for example, a user operation may comprise a forward command. Alternatively, or in addition and for example, a user operation may comprise a resume (play/activate) command. Alternatively, or in addition and for example, a user operation may comprise a play command. Alternatively, or in addition and for example, a user operation may comprise a activate command. Alternatively, or in addition and for example, a user operation may comprise a change-window-size command. For example, and as illustrated in FIG. 1 the user interface 350 may comprise a resume (play/activate) button, a pause button, a rewind button and a forward button. For example, the user interface 350 may comprise a resume (play/activate) button, a pause button, a rewind button, a forward button and a change-window-size button/control. For example, the user interface 350 may comprise a resume (play/activate) button and a rewind button. For example, the user interface 350 may comprise a resume (play/activate) button and a pause button. Alternatively, or in addition, further parameters such as a resume speed, a rewind speed, and/or a forward speed may be obtained via one or more control elements. Such parameters may e.g. be entered by one or more wheels with angles of rotation (they may be negative, zero, or positive) corresponding to values of the parameters. The one or more control elements may be mechanical or mechatronic such as e.g. a switch, a (touch) button, a slider, or a wheel. The one or more control elements may be virtual e.g. via a touch screen.

The writing instrument 300 may comprise a communication interface 360 configured to communicatively couple to an electronic device 402 such as e.g. a smart device/smartphone. In case of such a coupling the writing instrument 300 may be comprised by a writing instrument kit 400 for transforming speech into visual text. Thanks to the coupling, executing one or more algorithms may be outsourced to the electronic device 402 which typically has better computational resources than the writing instrument 300, 401 and/or components (such as e.g. a microphone in a smartphone) that may be synergistically used.

Furthermore, and as schematically illustrated in FIG. 7, there is disclosed a writing instrument kit 400 for transforming speech into visual text. The writing instrument kit 400 comprises a writing instrument 300, 401 and an electronic device 402 comprising a communication interface 460 configured to communicatively couple to the writing instrument 300, 401. The electronic device 402 may be smart device such as e.g. a smartphone, a tablet, a laptop, a desktop PC, a smartwatch, an e-book reader or the like. The electronic device 402 may be an electronic device for transforming speech into visual text. A/any/the electronic device 402 may be outside the writing instrument 300, 401.

The electronic device 402 may comprise a projector 420 configured to project 180 a portion 21 of a text 20 to the user. The projector 420 may be configured to project 180 the portion 21 of the text 20 onto or close to a writing surface being used by the user (e.g. to write on with the writing instrument 300, 401). In such a case the writing instrument 300, 401 may or may not comprise a projector 320. Projecting 180 from the electronic device rather than from the writing instrument 300, 401 may be more stable and/or do without image stabilization of the projection. The projector 420 may be a pico-projector.

The electronic device 402 may comprise a computer system 200, 430, e.g. a computer system 200, 330 configured to execute the computer-implemented method 100 (or parts thereof) for transforming speech into visual text. In this case, the computer-implemented method 100 for transforming speech into visual text (or parts of the method 100) may be executed in the electronic device 402 (i.e. not in the writing instrument 300, 401). The electronic device 402 may have more computational resources (e.g. in terms of memory and/or computing power) than the writing instrument 300, 401. The method 100 may be distributed among the writing instrument 300, 401 and the electronic device 402. In other words, one or more parts of the method 100 may be implemented in the writing instrument 300, 401 and one or more (other) parts of the method 100 may be implemented in the electronic device 402. For example, obtaining 110 the speech signal encoding the text of the speech may be outsourced (as a part of the method 100) to the electronic device 402. Alternatively, or in addition, any computational demanding algorithm of the method 100 (e.g. one or more pre-trained machine-learning algorithms such as e.g. one or more of the steps 112, 113, 152a, 153a, 190) may be outsourced (as one or more parts of the method 100) to the electronic device 402. Alternatively, or in addition, projecting 180 the portion of the text to the user may be implemented in the writing instrument 300, 401. In other words, in this case, projecting 180 the portion of the text to the user may not be outsourced (as a part of the method 100) to the electronic device 402.

The electronic device 402 comprises a microphone 440 configured to record the speech as the speech is delivered.

The electronic device 402 may comprise a user interface 450 configured to obtain 120 a projection mode of the writing instrument 300, 401 and/or to obtain 140 a user operation. The user interface 450 may comprise at least one control element one or more control elements configured to obtain a user operation from the user. For example, a user operation may comprise a pause command. Alternatively, or in addition and for example, a user operation may comprise a rewind command. alternatively, or in addition and for example, a user operation may comprise a forward command. Alternatively, or in addition and for example, a user operation may comprise a resume (play/activate) command. Alternatively, or in addition and for example, a user operation may comprise a play command. Alternatively, or in addition and for example, a user operation may comprise a activate command. Alternatively, or in addition and for example, a user operation may comprise a change-window-size command. For example, analogous to FIG. 1 the user interface 450 may have a resume (play/activate) button, a pause button, a rewind button and a forward button. Alternatively, or in addition, further parameters such as a resume speed, a rewind speed, and/or a forward speed may be obtained via one or more control elements. Such parameters may e.g. be entered via a form display on the electronic device 402 or by one or more virtual wheels with angles of rotation (they may be negative, zero, or positive) corresponding to values of the parameters. The one or more control elements such as e.g. a switch, a (touch) button, a slider, or a wheel may be virtual e.g. via a touch screen.

For example, a system (e.g. the writing instrument 300, 401 or the writing instrument kit 400) may be capable of projecting essentially in real time and/or interactively (e.g. via the user interface 350, 450), according to the user needs and speaker's tone, portions 21 of the text of a speech. The system (e.g. the writing instrument 300, 401 or the writing instrument kit 400) may comprise a hardware component and a software component the interaction of which may assist and facilitate the user to take handwritten notes of the speech.

The system (e.g. the writing instrument 300, 401 or the writing instrument kit 400) may comprise one or more microphones 340, 440 embedded in the writing instrument or in the electronic device 402, converting sound to an electrical signal.

For example, each microphone or some microphones may be located at the top of the writing instrument, at the middle of the writing instrument and/or at the bottom of the writing instrument. Each microphone or some microphones may have one or multiple openings located at one side of the writing instrument and/or all around the perimeter of the writing instrument. The type of the one or more microphones may be electric condenser, MEMS, dynamic, ribbon, piezoelectric, and/or fiber optic. The polar sensitivity of one or more of the microphones may be omnidirectional, bidirectional, cardioid, lobar, boundary and/or PZM. The frequency of the microphone may range from 1 Hz to 140 kHz covering the audible frequency spectrum. More preferably the microphones may be more sensitive at the voice frequency range of 1 Hz to 8 kHz.

Alternatively, or in addition the (smart) writing instrument 300, 401 may use the microphone of a connected adjacent electronic device 402 to capture and digitize sound. In this case, the converted speech to text data may be transmitted essentially in real time and e.g. wirelessly from the electronic device 402 to the (smart) writing instrument and/or to the (pico-)projector 320, 420.

For example, a/the (pico-)projector 320, 420 may be embedded in the writing instrument 300, 401. The (pico-)projector may contain an optical engine and an electronics module and the relevant firmware. The optical module may contain the micromirrors, a laser diode, combining optics, a photodiode, and/or a thermal sensor. The electronics module may contain a MEMS mirror driver, a digital controller (for video processing and closed-loop control of the projection system), one or more laser diode drivers, and/or other electronics. The (pico-)projector 320, 420 may be located at the top of the writing instrument, at the middle of the writing instrument, or at the bottom of the writing instrument. The (pico-)projector may or may not operate with laser beam scanning with MEMS mirror electrostatic or thin film piezo-electric technology, or LED with LcoS/DLP technology.

As examples, the (pico-)projector brightness may range from 800 to 2000 nits. For example, the projected text field of view may range from 30 to 70 degrees. For example, the projected text refresh rate may rate from 20 Hz to 100 Hz. For example, the projected text resolution may range from 320×240 to 8192×4320. For example, the (pico-)projector's brightness may range from 1 to 30 lm. For example, the weight of the (pico-)projector module may range from 30 to 100 g. For example, the (pico-)projector's dimension may range from 1 mm to 20 mm per direction. For example, the (pico-)projector may consume from 10 to 100 mW. For example, the (pico-)projector may project text over, under or at the sides of the handwritten notes. For example, the (pico-)projector may project text through the following means: Single monochromatic red or green or blue laser diode, RGB laser diodes, monochromatic microLED, and/or full color microLEDs.

For example, the writing instrument 300, 401 may comprise Speed, acceleration, and/or location sensors. These sensors may e.g. be used to detect and measure the handwriting data, and, in particular, e.g. the pace of writing action, the writing instrument inclination, the writing instrument location relative to the writing surface, the writing instrument contact to the writing surface, etc. and may include one or any of standard wearable sensors such as e.g.: An accelerometer of piezoresistive, piezoelectric or differential capacitive type; a gyroscope of gas bearing, optical, or mechanical type; a magnetometer of Hall effect type; an IMU (inertial measuring unit) combining accelerometer, gyroscope and magnetometer; a proximity sensor of inductive, capacitive, photoelectric, and ultrasonic type; and/or a pressure/force sensor of strain gage, capacitance, resistive, piezoelectric type.

For example, the writing instrument 300, 401 may comprise a microcontroller (more generally, a computer 200, 330). A microcontroller (MCU) may process and control all the sensors, actuators and functions of the smart writing instrument and may be of conventional wearable type or be able to perform advanced AI processing. It may contain a flash memory module 240. The microcontroller may be a conventional ultra-low power MCU suitable for wearable applications such as but not limited to a 16 or 32-bit-ARM MCU. In another embodiment microcontroller may be based on a more advanced platform such as customizable single-chip ASIC AI or be based on a RISC-V AI architecture. Microcontroller may have a custom operating firmware.

For example, the writing instrument may have network capability 360. Wireless connectivity may be needed for the (smart) writing instrument 300, 401 to interact with other devices (e.g. the electronic device 402). The writing instrument and any other device may be required to support one of the different wireless protocols such as e.g.: Wi-Fi, ANT+, Bluetooth Low Energy (BLE), and/or IEEE 802.15.4.

For example, the writing instrument 300, 401 may comprise buttons to control smart writing instrument functions and the projected text flow rate. The control buttons may be located on the one side or on the periphery of the (smart) writing instrument 300, 401 and their type can e.g. be one of the following: touch buttons, switches, rotation, and/or sliding.

For example, the electronic components of the (smart) writing instrument 300, 401 may e.g. be powered by one or more of: disposable batteries, plug-in rechargeable batteries, and/or wireless inductive charging module.

The electronic device 402 may comprise an application (i.e. an app) controlling the properties of the (smart) writing instrument 300, 401. Settings and/or functions of the (smart) writing instrument 300, 401 may be controlled via a display of the electronic device.

Each of the aforementioned artificial intelligence (AI) algorithms may be a machine learning algorithm pre-trained via supervised learning.

Although the present subject-matter has been described above and is defined in the attached claims, it should be understood that the subject-matter may alternatively be defined in accordance with the following embodiments:

1. A computer-implemented method (100) for transforming speech into visual text, comprising:
   obtaining (110) a speech signal (10) encoding a text (20) of a speech;
   selecting (150) a portion (21) of the text (20) at least based on a projection mode of a writing instrument (300, 401);
   outputting (170) the portion (21) of the text (20) towards a projector (320, 420) configured to project (180) the portion (21) of the text (20) to a user of the writing instrument (300, 401).

2. The method (100) of embodiment 1, wherein the writing instrument (300, 401) is used by the user to take notes of and during the speech.

3. The method (100) of embodiment 1 or 2, wherein the writing instrument (300, 401) comprises the projector (320).

4. The method (100) of one of the preceding embodiments, wherein the projector (320, 420) is configured to project the portion (21) of the text (20) onto a writing surface being used by the user.

5. The method (100) of one of the preceding embodiments, comprising:
   projecting (180) the portion (21) of the text (20) to the user.

6. The method (100) of one of the preceding embodiments, wherein the projection mode is one of a plurality of projection modes of the writing instrument (300, 401).

7. The method (100) of one of the preceding embodiments, wherein the projection mode or the plurality of projection modes comprises a first projection mode;
   wherein selecting (150) the portion (21) of the text (20) at least based on the projection mode, in case the projection mode is the first projection mode, comprises selecting (151), as the portion (21) of the text (20), the text (20) restricted to a current lagging window (11, 12) of the speech signal (10).

8. The method (100) of one of the preceding embodiments, wherein the projection mode or the plurality of projection modes comprises a second projection mode;
   wherein selecting (150) the portion (21) of the text (20) at least based on the projection mode, in case the projection mode is the second projection mode, comprises selecting (152b), as the portion (21) of the text (20), the text (20) restricted to a handwriting lagging window (11, 13) of the speech signal (10).

9. The method (100) of one of the preceding embodiments, comprising:
   obtaining (130) handwriting data of the user of the writing instrument (300, 401) taking the notes of and during the speech with the writing instrument (300, 401).

10. The method (100) of embodiment 9, wherein obtaining (130) the handwriting data comprises obtaining (131) the handwriting data from one or more sensors (310) in the writing instrument (300, 401).

11. The method (100) of embodiment 9 or 10, when dependent on embodiment 8, comprising:

computing (152*a*) the handwriting lagging window (11, 13) of the speech signal (10) at least based on the handwriting data.

12. The method (100) of one of the preceding embodiments, wherein the projection mode or the plurality of projection modes comprises a third projection mode;

wherein selecting (150) the portion (21) of the text (20) at least based on the projection mode, in case the projection mode is the third projection mode, comprises selecting (153*b*), as the portion (21) of the text (20), the text (20) restricted to a user-defined lagging window (11, 14) of the speech signal (10).

13. The method (100) of embodiment 12, comprising:

obtaining (140) a user operation of the user;

computing (153*a*) the user-defined lagging window (11, 14) of the speech signal (10) at least based on the user operation.

14. The method (100) of embodiment 13, wherein the user operation is obtained (140) from the user via a user interface (350, 450) of the writing instrument (300, 401) or of an electronic device (402) communicatively coupled to the writing instrument (300, 401).

15. The method (100) of embodiment 13 or 14, where the user operation is one of a plurality of user operations.

16. The method (100) of one of the embodiments 13 to 15, wherein the user operation or the plurality of user operations comprises a pause command;

wherein computing (153*a*) the user-defined lagging window (11, 14) of the speech signal (10) at least based on the user operation, in case the user operation is the pause command, comprises freezing (154*a*) a window (11) of the speech signal (10).

17. The method (100) of one of the embodiments 13 to 16, wherein the user operation or the plurality of user operations comprises a rewind command;

wherein computing (153*a*) the user-defined lagging window (11, 14) of the speech signal (10) at least based on the user operation, in case the user operation is the rewind command, comprises shifting (154*b*) a window (11) of the speech signal (10) backward.

18. The method (100) of one of the embodiments 13 to 17, wherein the user operation or the plurality of user operations comprises a forward command;

wherein computing (153*a*) the user-defined lagging window (11, 14) of the speech signal (10) at least based on the user operation, in case the user operation is the forward command, comprises shifting (154*c*) a window (11) of the speech signal (10) forward.

19. The method (100) of one of the embodiments 13 to 18, wherein the user operation or the plurality of user operations comprises a resume command;

wherein computing (153*a*) the user-defined lagging window (11, 14) of the speech signal (10) at least based on the user operation, in case the user operation is the resume command, comprises shifting (154*c*) a window (11) of the speech signal (10) forward.

20. The method (100) of one of the embodiments 13 to 19, wherein the user operation or the plurality of user operations comprises a change-window-size command;

wherein computing (153*a*) the user-defined lagging window (11, 14) of the speech signal (10) at least based on the user operation, in case the user operation is the change-window-size command, comprises changing (154*d*) the size of a window (11) of the speech signal (10).

21. The method (100) of one of the preceding embodiments, comprising:

obtaining (121) a default projection mode of the writing instrument (300, 401).

22. The method (100) of one of the preceding embodiments, comprising obtaining (120) the projection mode of the writing instrument (300, 401).

23. The method (100) of embodiment 22, wherein obtaining (120) the projection mode of the writing instrument (300, 401) comprises obtaining (120) the projection mode of the writing instrument (300, 401) via a user interface (350, 450) of the writing instrument (300, 401) or of an electronic device (402) communicatively coupled to the writing instrument (300, 401).

24. The method (100) of embodiment 22 or 23, wherein obtaining (120) the projection mode of the writing instrument (300, 401) comprises (121) obtaining the default projection mode and/or setting the projection mode to the default projection mode.

25. The method (100) of one of the preceding embodiments, when dependent on embodiment 9, comprising:

testing (190), based on the handwriting data and the text (20), whether the user taking the notes of the speech is lagging behind the speech.

26. The method (100) of embodiment 25, when dependent on embodiment 7 and/or 8, comprising:

setting (191) the projection mode to the second projection mode, when at least testing (190) is in the affirmative; and/or setting (192) the projection mode to the first projection mode, when at least testing (190) is in the negative.

27. The method (100) of embodiment 26, wherein computing (152*a*) the handwriting lagging window (11, 13) of the speech signal (10) is such that the handwriting lagging window (11, 13) is increased to a current lagging window (11, 12) of the speech signal (10) and/or a window (11) change is decelerated, when at least testing (190) is in the affirmative.

28. The method (100) of embodiment 26 or 27, wherein computing (152*a*) the handwriting lagging window (11, 13) of the speech signal (10) is such that the handwriting lagging window (11, 13) is decreased and/or a window (11) change is accelerated, when at least testing (190) is in the negative.

29. The method (100) one of the preceding embodiments, wherein the portion (21) of the text (20) is selected (150) so as to assist the user in taking the notes of the speech.

30. The method (100) of one of the preceding embodiments, wherein obtaining (110) the speech signal (10) encoding the text (20) of the speech is done while the user of the writing instrument (300, 401) is taking notes of the speech.

31. The method (100) of one of the preceding embodiments, wherein obtaining (110) the speech signal (10) comprises successively obtaining the speech signal (10) as the speech is delivered.

32. The method (100) of one of the preceding embodiments, wherein obtaining (110) the speech signal (10) comprises (111):

continuously recording the speech as the speech is delivered via a microphone (340, 440) of the writing instrument (300, 401) or of an electronic device (402) communicatively coupled to the writing instrument (300, 401); and successively building up the speech signal (10).

33. The method (100) of one of the preceding embodiments, comprising:

extracting (112) the text (20) of the speech encoded in the speech signal (10).

34. The method (100) of embodiment 33, wherein the text (20) is extracted (112) in the writing instrument (300, 401) or in an electronic device (402) communicatively coupled to the writing instrument (300, 401).

35. The method (100) of one of the preceding embodiments, wherein the speech signal (10) further encodes a signal of speech property (30) accompanying the speech as the speech progresses.

36. The method (100) of embodiment 35, comprising:

extracting (113) the signal of speech property (30) encoded in the speech signal (10).

37. The method (100) of embodiment 36, wherein the signal of speech property (30) is extracted (113) in the writing instrument (300, 401) or in an electronic device (402) communicatively coupled to the writing instrument (300, 401).

38. The method (100) of one of the embodiments 35 to 37, wherein the speech property at least relates to one or more of:

emphasis;
   phonation;
   loudness;
   intonation;
   stress;
   rate;
   pitch level;
of the speech signal (10).

39. The method (100) of one of the embodiments 35 to 38, comprising:

specifying (160) an output format for the portion (21) of the text (20) based on the text (20) and/or the signal of speech property (30);
   outputting (171) the output format for the portion (21) of the text (20) towards the projector (320, 420);
wherein the projector (320, 420) is further configured to project (180) the portion (21) of the text (20) in the specified (160) output format to the user.

40. The method (100) of one of the embodiments 35 to 39, comprising:

testing (161), whether at least one subportion (22) of the portion (21) of the text (20) corresponds to a signal of speech property (30) satisfying a predetermined criterion;
   specifying (162) an output subformat for the at least one subportion (22), if testing (161) is in the affirmative;
   outputting (172) the output subformat for the subportion (22) of the portion (21) of the text (20) towards the projector (320, 420);
wherein the projector (320, 420) is further configured to project (180) the subportion (22) of the portion (21) of the text (20) in the specified (162) output subformat to the user.

41. A computer system (200) configured to execute the computer-implemented method (100) for transforming speech into visual text according to one of the preceding embodiments.

42. A computer program (210) configured to execute the computer-implemented method (100) for transforming speech into visual text according to one of the embodiments 1 to 40.

43. A computer-readable medium or signal (220) storing the computer program (210) of embodiment 42.

44. A writing instrument (300) for transforming speech into visual text, comprising one or more sensors (310) configured to capture handwriting data of a user taking with the writing instrument (300) notes of and during a speech corresponding to a speech signal (10) encoding a text (20) of the speech.

45. The writing instrument (300) of embodiment 44, comprising a projector (320) configured to project (180) a portion (21) of a text (20) to the user.

46. The writing instrument (300) of embodiment 45, wherein the projector (320) is configured to project (180) the portion (21) of the text (20) onto a writing surface being used by the user to write on with the writing instrument (300).

47. The writing instrument (300) of one of the embodiments 44 to 46, comprising a computer system (200, 330) according to embodiment 41 [e.g. a computer system (200, 330) configured to execute the computer-implemented method (100) for transforming speech into visual text according to one of the embodiments 1 to 40].

48. The writing instrument (300) of one of the embodiments 44 to 47, comprising a microphone (340) configured to record the speech as the speech is delivered.

49. The writing instrument (300) of one of the embodiments 44 to 48, comprising a user interface (350) configured to obtain (120) a projection mode of the writing instrument (300) and/or to obtain (140) a user operation.

50. The writing instrument (300) of embodiment 49, wherein the user interface (350) comprises one or more control elements configured to obtain a user operation comprising:

a pause command;
   a rewind command;
   a forward command;
   a resume command; and/or
   a change-window-size command;
from the user.

51. The writing instrument (300) of one of the embodiments 44 to 50, comprising a communication interface (360) configured to communicatively couple to an electronic device (402).

52. A writing instrument kit (400) for transforming speech into visual text, comprising:

a writing instrument (300, 401) of one of the embodiments 44 to 51, when dependent on embodiment 51;
   an electronic device (402) comprising a communication interface (460) configured to communicatively couple to the writing instrument (300, 401).

53. The writing instrument kit (400) of embodiment 52, wherein the electronic device (402) comprises a projector (420) configured to project (180) a portion (21) of a text (20) to the user.

54. The writing instrument kit (400) of embodiment 53, wherein the projector (420) is configured to project (180) the portion (21) of the text (20) onto or close to a writing surface being used by the user to write on with the writing instrument (300, 401).

55. The writing instrument kit (400) of one of the embodiments 52 to 54, wherein the electronic device (402) comprises a computer system (200, 430) according to embodiment 41 [e.g. a computer system (200, 330) configured to execute the computer-implemented method (100) for transforming speech into visual text according to one of the embodiments 1 to 40].

56. The writing instrument kit (400) of one of the embodiments 52 to 55, wherein the electronic device (402) comprises a microphone (440) configured to record the speech as the speech is delivered.

57. The writing instrument kit (400) of one of the embodiments 52 to 56, wherein the electronic device (402) comprises a user interface (450) configured to obtain (120) a projection mode of the writing instrument (300, 401) and/or to obtain (140) a user operation.

58. The writing instrument kit (400) of embodiment 57, wherein the user interface (450) comprises at least one control element one or more control elements configured to obtain a user operation comprising:

a pause command;
a rewind command;
a forward command;
a resume command; and/or
a change-window-size command;
from the user.

REFERENCE NUMERALS 10 speech signal
11 window
12 current lagging window
13 handwriting lagging window
14 user-defined lagging window
20 text encoded in a speech signal
21 portion of the text
22 subportion of the text
30 signal of speech property
100 computer-implemented method for transforming speech into visual text
110 obtaining a speech signal encoding a text of a speech
111 (continuously) recording the speech as the speech is delivered via a microphone and successively building up the speech signal
112 extracting the text of the speech encoded in the speech signal
113 extracting the signal of speech property encoded in the speech signal
120 obtaining the projection mode of the writing instrument
121 obtaining the default projection mode and/or setting the projection mode to the default projection mode
130 obtaining handwriting data of the user of the writing instrument taking the notes of and during the speech with the writing instrument
131 obtaining the handwriting data from one or more sensors in the writing instrument
140 obtaining a user operation of the user
150 selecting a portion of the text at least based on a projection mode of a writing instrument
151 selecting, as the portion of the text, the text restricted to a current lagging window of the speech signal
152a computing the handwriting lagging window of the speech signal at least based on the handwriting data
152b selecting, as the portion of the text, the text restricted to a handwriting lagging window of the speech signal
153a computing the user-defined lagging window of the speech signal at least based on the user operation
153b selecting, as the portion of the text, the text restricted to a user-defined lagging window of the speech signal
154a freezing a window of the speech signal
154b shifting a window of the speech signal backward
154c shifting a window of the speech signal forward
154d changing the size of a window of the speech signal
160 specifying an output format for the portion of the text based on the text and/or the signal of speech property
161 testing, whether at least one subportion of the portion of the text corresponds to a signal of speech property satisfying a predetermined criterion 162 specifying an output subformat for the at least one subportion, if testing is in the affirmative
170 outputting the portion of the text towards a projector
171 outputting the output format for the portion of the text towards the projector
172 outputting the output subformat for the subportion of the portion of the text towards the projector
180 projecting the portion of the text to the user
190 testing, based on the handwriting data and the text, whether the user taking the notes of the speech is lagging behind the speech
191 setting the projection mode to the second projection mode, when at least testing is in the affirmative
192 setting the projection mode to the first projection mode, when at least testing is in the negative
200, 330, 430 computer system
210 computer program
220 computer-readable medium or signal
230 processor
240 memory, RAM
250 non-volatile memory
300, 401 writing instrument
310 one or more sensors
320, 420 projector
340, 440 microphone
350, 450 user interface
360, 460 communication interface
400 writing instrument kit
402 electronic device

The invention claimed is:

1. A computer-implemented method for transforming speech into visual text, comprising:
obtaining a speech signal encoding a text of a speech;
selecting a portion of the text at least based on a projection mode of a writing instrument; wherein the projection mode is one of a plurality of projection modes of the writing instrument, wherein the plurality of projection modes comprises a first projection mode; wherein selecting the portion of the text at least based on the projection mode, in case the projection mode is the first projection mode, comprises selecting, as the portion of the text, the text restricted to a current lagging window of the speech signal, and
outputting the portion of the text towards a projector configured to project the portion of the text to a user of the writing instrument.

2. The method of claim 1, wherein the writing instrument comprises the projector, wherein the projector is configured to project the portion of the text onto a writing surface being used by the user;
wherein the method comprises:
projecting the portion of the text to the user.

3. The method of claim 1, wherein obtaining the speech signal encoding the text of the speech is done while the user of the writing instrument is taking notes of the speech;
wherein the plurality of projection modes comprises a second projection mode;
wherein selecting the portion of the text at least based on the projection mode, in case the projection mode is the second projection mode, comprises selecting, as the portion of the text, the text restricted to a handwriting lagging window of the speech signal.

4. The method of claim 3, comprising:
obtaining handwriting data of the user of the writing instrument taking the notes of and during the speech with the writing instrument, wherein obtaining the handwriting data comprises obtaining the handwriting data from one or more sensors in the writing instrument; the method comprising:

computing the handwriting lagging window of the speech signal at least based on the handwriting data.

5. The method of claim 4, comprising:

testing, based on the handwriting data and the text, whether the user taking the notes of the speech is lagging behind the speech;

setting the projection mode to the second projection mode, when at least testing is in the affirmative; and/or setting the projection mode to the first projection mode, when at least testing is in the negative.

6. The method of claim 5, wherein computing the handwriting lagging window of the speech signal is such that the handwriting lagging window is increased to a current lagging window of the speech signal and/or a window change is decelerated, when at least testing is in the affirmative;

wherein computing the handwriting lagging window of the speech signal is such that the handwriting lagging window is decreased and/or a window change is accelerated, when at least testing is in the negative.

7. The method of claim 1, wherein the plurality of projection modes comprises a third projection mode;

wherein selecting the portion of the text at least based on the projection mode, in case the projection mode is the third projection mode, comprises selecting, as the portion of the text, the text restricted to a user-defined lagging window of the speech signal.

8. The method of claim 7, comprising:

obtaining a user operation of the user;

computing the user-defined lagging window of the speech signal at least based on the user operation;

wherein the user operation is obtained from the user via a user interface of the writing instrument or of an electronic device communicatively coupled to the writing instrument.

9. The method of claim 8, where the user operation is one of a plurality of user operations, wherein the user operation or the plurality of user operations comprises a pause command;

wherein computing the user-defined lagging window of the speech signal at least based on the user operation, in case the user operation is the pause command, comprises freezing a window of the speech signal.

10. The method of claim 8, wherein the user operation or the plurality of user operations comprises a rewind command;

wherein computing the user-defined lagging window of the speech signal at least based on the user operation, in case the user operation is the rewind command, comprises shifting a window of the speech signal backward.

11. The method of claim 1, wherein the speech signal further encodes a signal of speech property accompanying the speech as the speech progresses, wherein the speech property at least relates to one or more of:

emphasis;
phonation;
loudness;
intonation;
stress;
rate;
pitch level;
of the speech signal;

the method comprising:

extracting the signal of speech property encoded in the speech signal;

testing, whether at least one subportion of the portion of the text corresponds to a signal of speech property satisfying a predetermined criterion;

specifying an output subformat for the at least one subportion, if testing is in the affirmative;

outputting the output subformat for the subportion of the portion of the text towards the projector;

wherein the projector is further configured to project the subportion of the portion of the text in the specified output subformat to the user.

12. The writing instrument according to claim 11, comprising a communication interface configured to communicatively couple to an electronic device.

13. A writing instrument for transforming speech into visual text, comprising:

one or more sensors configured to capture handwriting data of a user taking with the writing instrument notes of and during a speech corresponding to a speech signal encoding a text of the speech;

a projector configured to project a portion of a text to the user, wherein the projector is configured to project the portion of the text onto a writing surface being used by the user to write on with the writing instrument;

a computer system configured to execute the computer-implemented method for transforming speech into visual text according to claim 1.

14. The writing instrument according to claim 13, comprising:

a microphone configured to record the speech as the speech is delivered.

15. The writing instrument according to claim 13 comprising:

a user interface configured to obtain a projection mode of the writing instrument and/or to obtain a user operation;

wherein the user interface comprises one or more control elements configured to obtain a user operation comprising:

a pause command;
a rewind command;
a forward command;
a resume command; and/or
a change-window-size command;
from the user.

16. A writing instrument kit for transforming speech into visual text, comprising:

a writing instrument of claim 13;

an electronic device comprising a communication interface configured to communicatively couple to the writing instrument.

17. The writing instrument kit of claim 16, wherein the electronic device comprises a projector configured to project a portion of a text to the user.

18. The writing instrument kit of claim 17, wherein the projector is configured to project the portion of the text onto or close to a writing surface being used by the user to write on with the writing instrument.

19. The writing instrument kit of claim 16, wherein the electronic device comprises a computer system configured to execute the computer-implemented method for transforming speech into visual text, the method comprising:

obtaining a speech signal encoding a text of a speech;

selecting a portion of the text at least based on a projection mode of a writing instrument wherein the projection mode is one of a plurality of projection modes of the writing instrument, wherein the plurality of projection modes comprises a first projection mode; wherein selecting the portion of the text at least based on the projection mode, in case the projection mode is the first projection mode, comprises selecting, as the portion of the text, the text restricted to a current lagging window of the speech signal, outputting the portion of the text towards a projector configured to project the portion of the text to a user of the writing instrument.

20. The writing instrument kit of claim 16, wherein the electronic device comprises a microphone configured to record the speech as the speech is delivered.

* * * * *